United States Patent
Nota et al.

[11] Patent Number: 5,983,359
[45] Date of Patent: Nov. 9, 1999

[54] PROCESSOR FAULT RECOVERING METHOD FOR INFORMATION PROCESSING SYSTEM

[75] Inventors: Tadashi Nota, Sagamihara; Hitoshi Ueno, Atsugi; Yuki Kashiyama, Isehara, all of Japan

[73] Assignee: Hitachi, Ltd., Tokyo, Japan

[21] Appl. No.: 08/820,232

[22] Filed: Mar. 18, 1997

[30] Foreign Application Priority Data

Mar. 18, 1996 [JP] Japan .................................... 8-061313

[51] Int. Cl.⁶ ...................................................... G06F 11/16
[52] U.S. Cl. ................................................ 714/10; 714/15
[58] Field of Search ........................... 395/182.08–182.09, 395/182.11, 181, 182.01, 200.38, 200.39, 182.13

[56] References Cited

U.S. PATENT DOCUMENTS

| | | | |
|---|---|---|---|
| 4,819,232 | 4/1989 | Krings | 395/182.11 |
| 5,214,652 | 5/1993 | Sutton | 371/9.1 |
| 5,235,700 | 8/1993 | Alaiwan et al. | 395/182.11 |
| 5,636,341 | 6/1997 | Matsushita et al. | 395/182.11 |
| 5,799,323 | 8/1998 | Mosher, Jr. et al. | 707/202 |
| 5,815,651 | 9/1998 | Litt | 395/182.08 |

FOREIGN PATENT DOCUMENTS

| | | | |
|---|---|---|---|
| A-60-54052 | 2/1983 | Japan | G06F 11/20 |
| A-2-266457 | 6/1989 | Japan | G06F 15/16 |
| A-2-202636 | 8/1990 | Japan | G06F 11/18 |
| A-2-202637 | 8/1990 | Japan | G06F 11/18 |
| A-2-202638 | 8/1990 | Japan | G06F 11/18 |
| A-40213736 | 8/1992 | Japan | G06F 11/20 |
| A-5-108391 | 4/1993 | Japan | G06F 11/20 |

*Primary Examiner*—Robert W. Beausoliel, Jr.
*Assistant Examiner*—Scott Baderman
*Attorney, Agent, or Firm*—Antonelli, Terry, Stout & Kraus, LLP

[57] ABSTRACT

A fault recovering method for substituting an instruction processor (IP) for a system supporting processor to execute processing thereof when the system supporting processor fails. An apparatus implementing this processing method comprises a plurality of processors, at least one of which is operated as a system supporting processor (SSP) and the rest of which are operated as instruction processors. When the SSP fails, an interrupt is generated to an OS running on at least one IP. The OS recognizes that a fault occurred in the IP, abnormally terminates an application program which has been running on the IP when the interrupt was generated, or stops instruction processing as the IP falling into a hardware failure state, or input a command for disconnecting an alternate instruction processor for the system supporting processor, so that the IP takes over functions of the SSP.

11 Claims, 21 Drawing Sheets

SYSTEM CONFIGURATION

PROCESSING OF SYSTEM SUPPORTING PROCESSOR

FLOW CHART OF PROCESSING FOR REPORTING FAULT IN SYSTEM SUPPORTING PROCESSOR

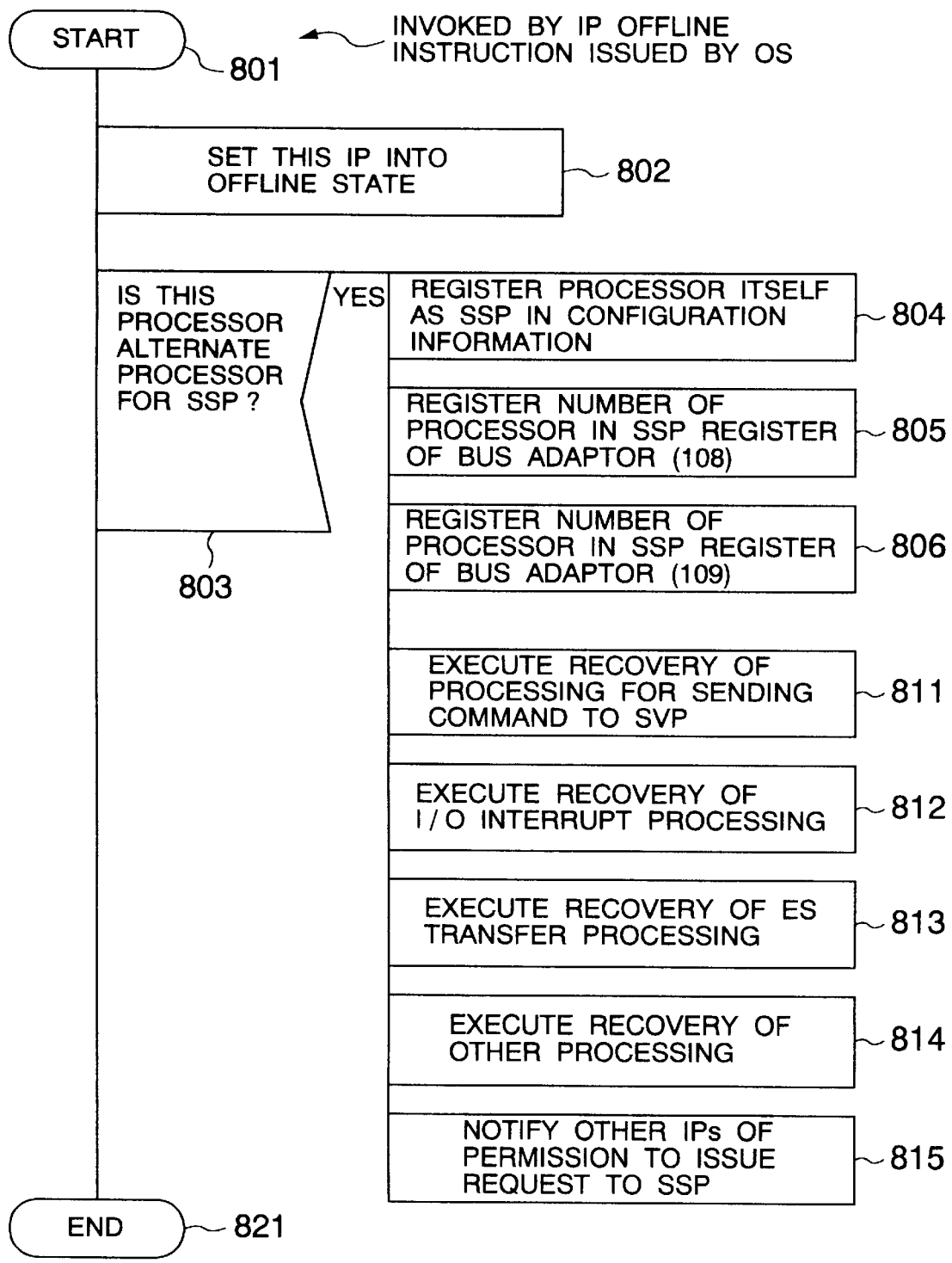

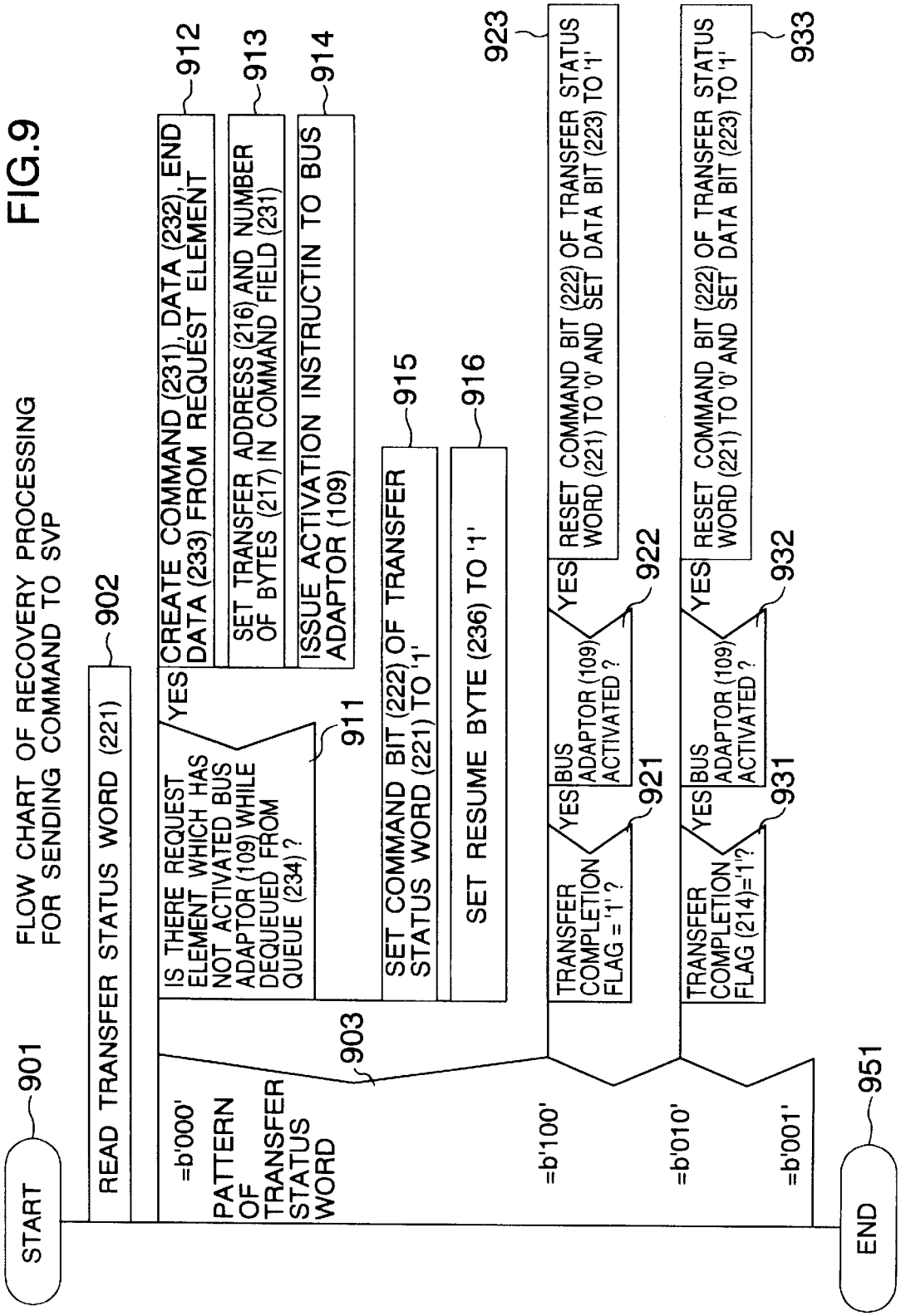

FIG.10

FLOW CHART OF PROCESSING FOR RECOVERING EXECUTION OF I/O INTERRUPT

START — 1001

↓

SEARCH JOURNAL (251) IN REVERSE ORDER FROM RECORD POINTED BY WRITE POINTER (253) — 1002

↓

1003 — RECORD WITH JOURNAL TYPE FROM 10 TO 14 FOUND?

- YES →
- (NO) → END — 1021

↓

1004 — MAXIMUM VALUE OF FOUND JOURNAL TYPE?
- =14 →
- ≠14 ↓

1005 — MAXIMUM VALUE OF FOUND JOURNAL TYPE?
- =13 →
- ≠13 ↓

1006 — MAXIMUM VALUE OF FOUND JOURNAL TYPE?
- =12 →
- ≠12 ↓

1007 — MAXIMUM VALUE OF FOUND JOURNAL TYPE?
- =11 →
- ≠11 ↓ (to 1008)

1008 — LOCK I/O INTERRUPT CONTROL BLOCK

↓

1009 — CLEAR I/O INTERRUPT INFORMATION (246)

↓

1010 — RESET INTERRUPT FACTOR FOR BUS ADAPTOR (108)

↓

1011 — RELEASE I/O INTERRUPT CONTROL BLOCK FROM LOCK

↓

1012 — NOTIFY IPs (102~104) OF I/O INTERRUPT

↓

END — 1021

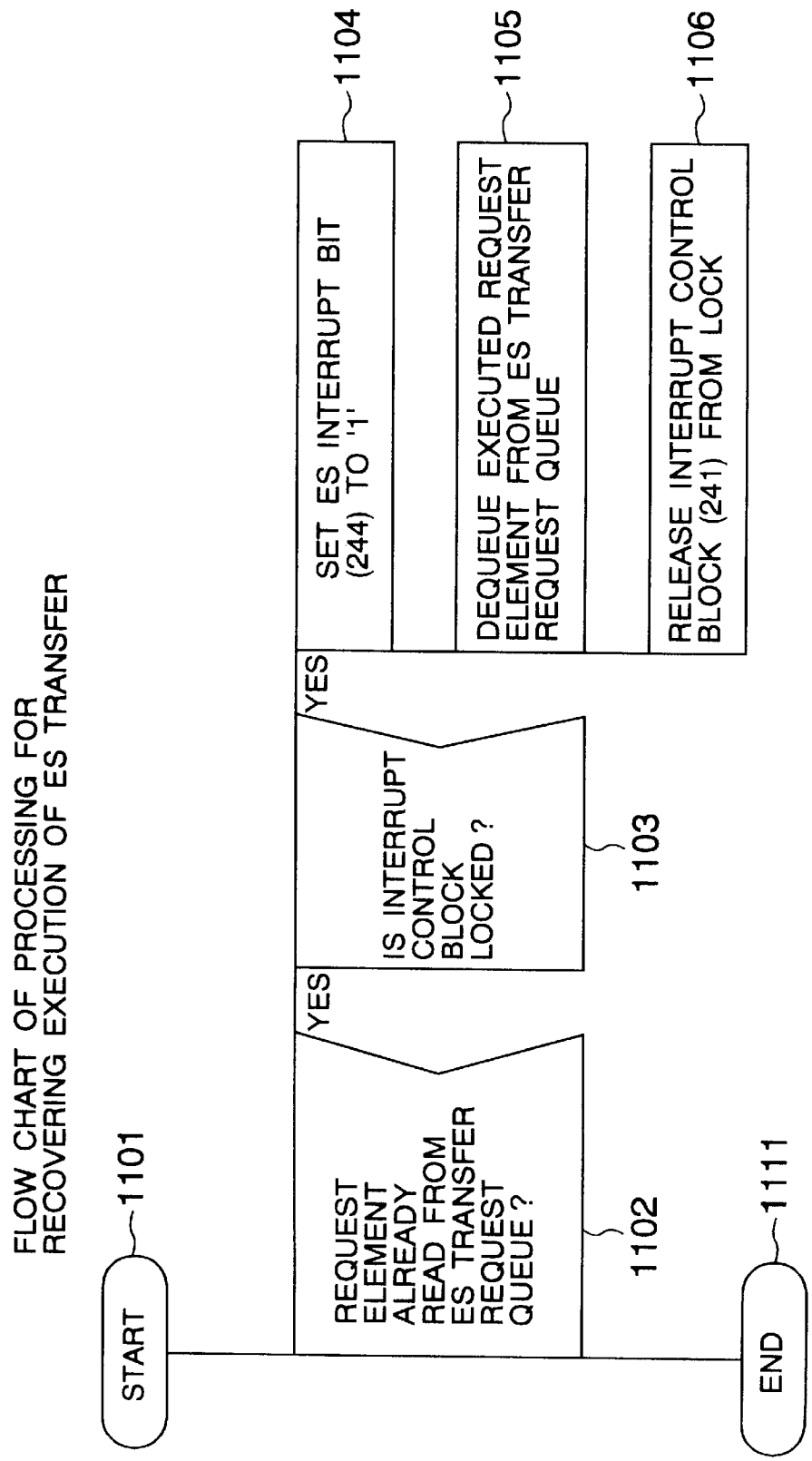

INTERNAL CONFIGURATION OF IP0

INTERNAL CONFIGURATION OF SSP

INTERNAL CONFIGURATION OF MS

INTERNAL CONFIGURATION OF SVP

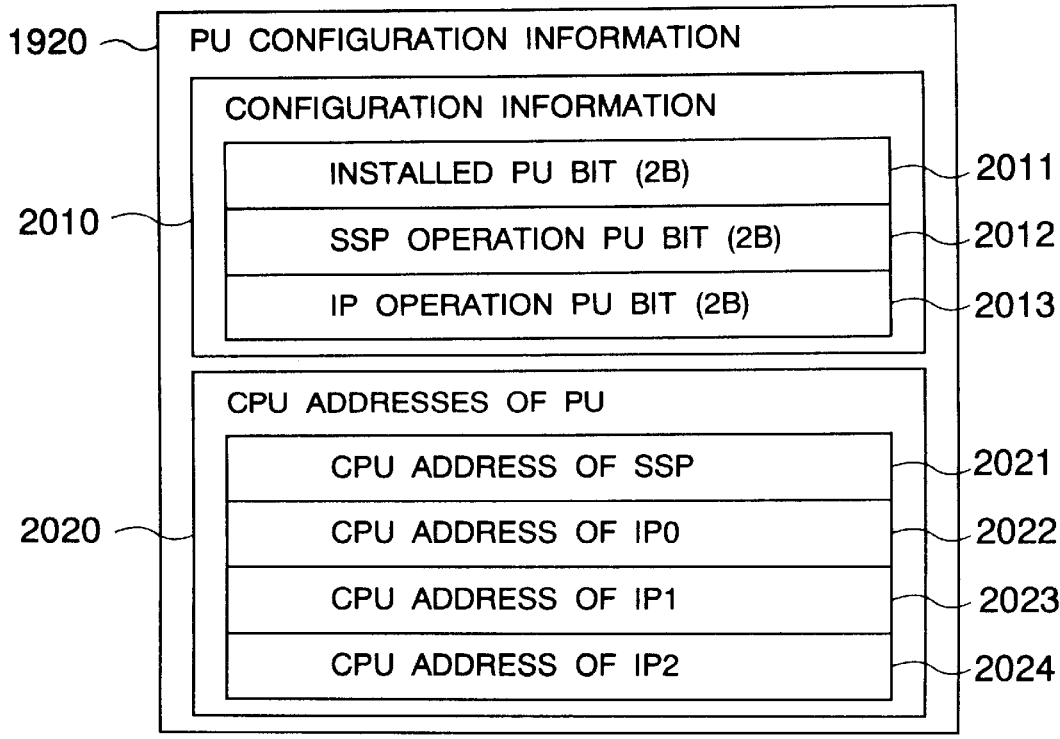
FIG.20  PU CONFIGURATION INFORMATION
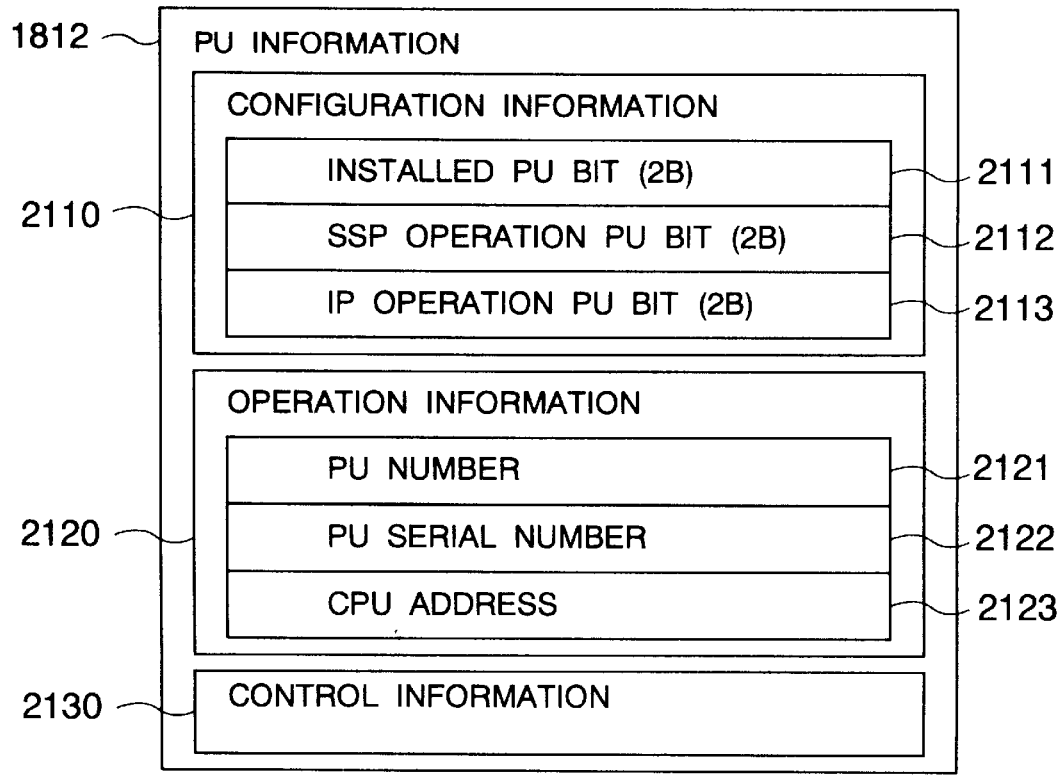
FIG.21  PU INFORMATION FIG.22  SAVED PU INFORMATION
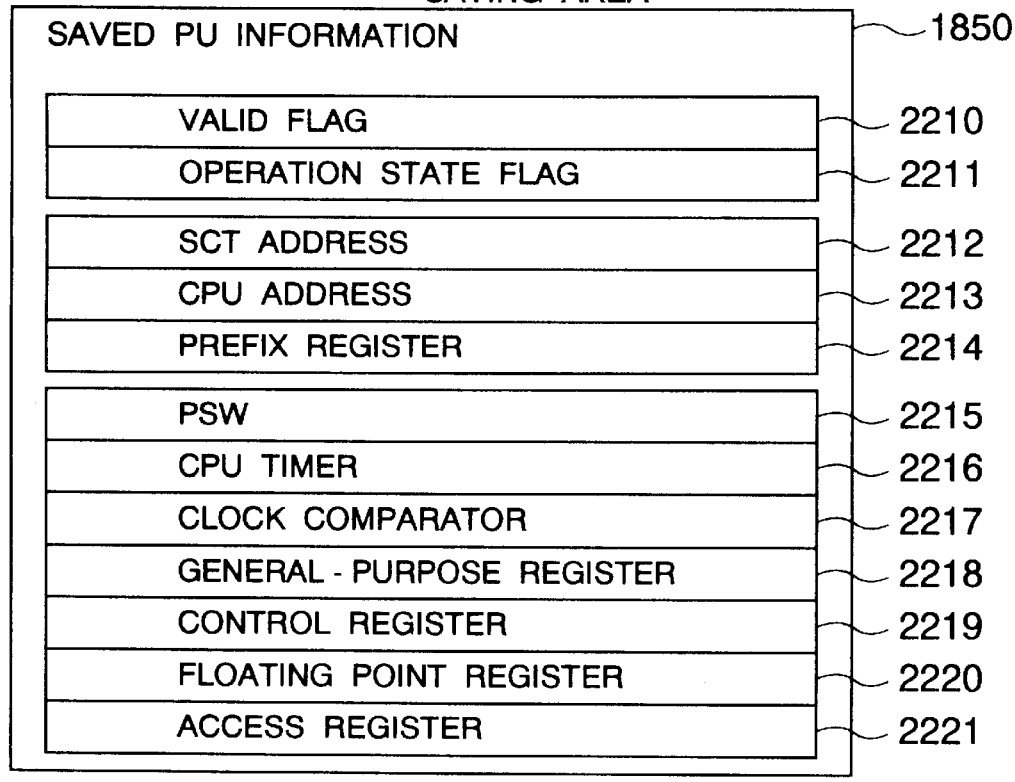
FIG.23  SSP FAULT DETECTION PROCESSING
μP FAULT DETECTION PROCESSING
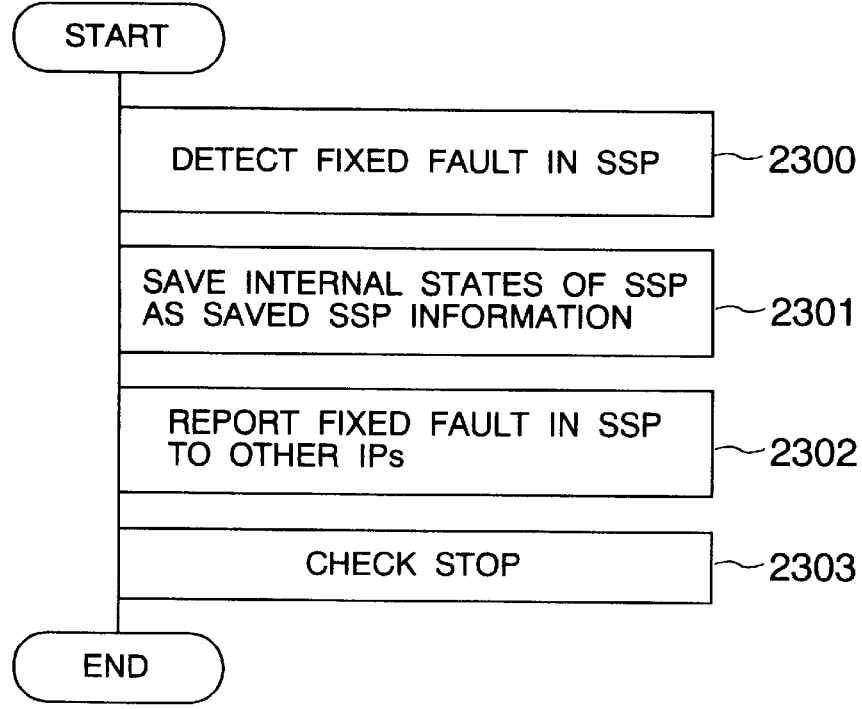

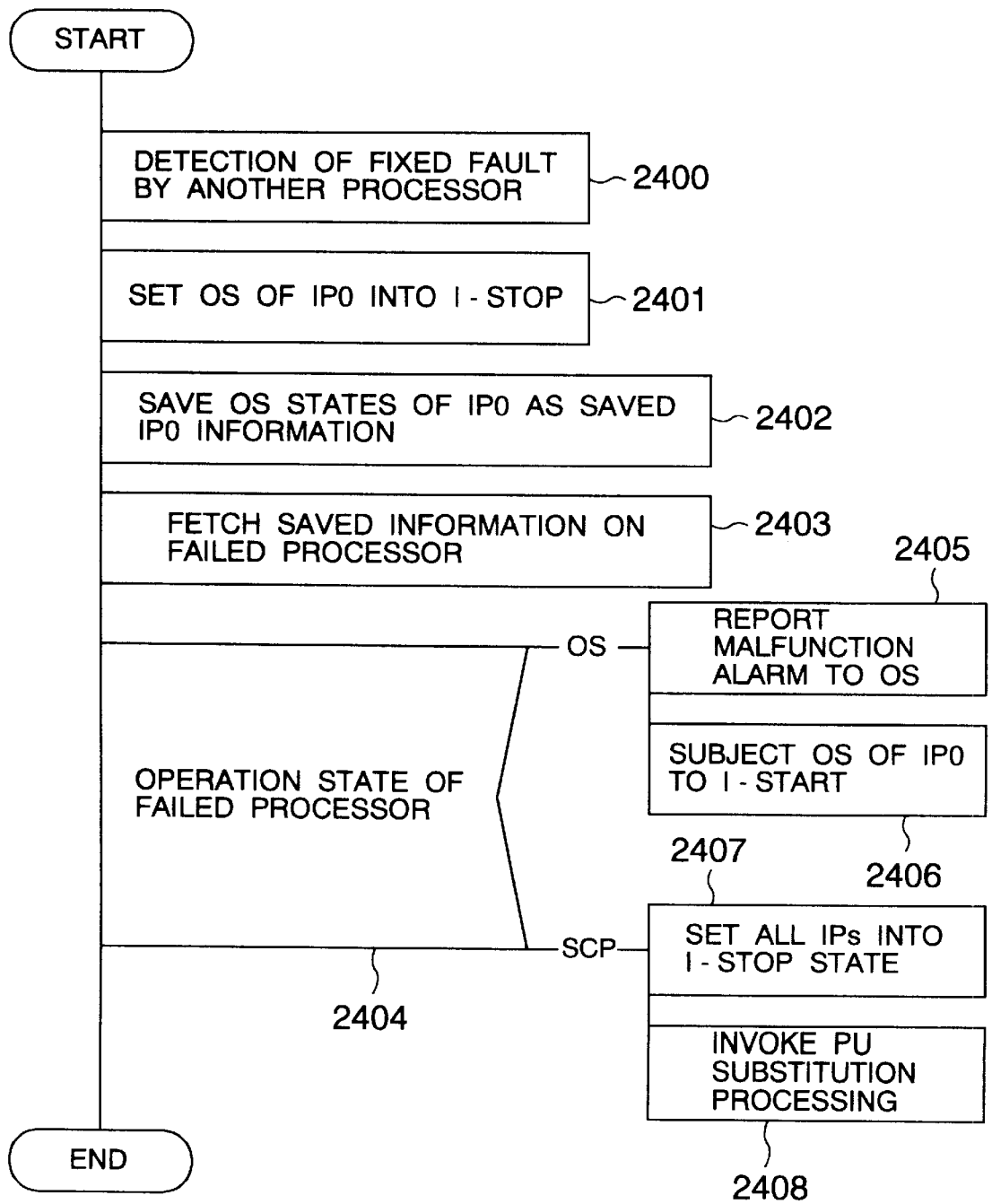

PROCESSOR FAULT RECOVERING METHOD FOR INFORMATION PROCESSING SYSTEM

BACKGROUND OF THE INVENTION

The present invention relates generally to a processor fault recovering method for an information processing system of a multiprocessor configuration, and more particularly to a processor fault recovering method for an information processing system which recovers a failed processor control program when a fixed fault occurs in a processor.

In recent years, the advance of computer systems enhances the utilization of computer systems in a variety of fields, and utilization forms thereof have become increasingly complicated. Thus, a system down would cause larger influences on the society, so that a high reliability is required to the computer systems.

Known as techniques for providing a high reliability required for the computer systems are a recovery technique implemented by retry or the like for intermittent faults of processors, a relief technique utilizing redundancy of components for eliminating fixed faults of processors, and so on in an information processing system having a multiprocessor configuration in which a single operating system runs on a plurality of processors.

In addition, as the prior art related to a processing execution control method, there is, for example, JP-A-2-266457 and so on. This prior art method is applied to a multiprocessor-based information processing system, when a fixed fault occurs in a processor, for creating a virtual processor with a normal processor such that the virtual processor takes over the processing so far executed by the failed processor to avoid a system down and prevent the processing under execution from being interrupted.

On the other hand, as the prior art related to a processing succession method for a computer system having a loosely coupled multiprocessor configuration, techniques described, for example, in JP-A-60-54052 and so on are known. This prior art method utilizes a shared memory through which another normal processor takes over management information from a failed processor, thereby allowing the processing to be continuously executed.

Further, as the prior art related to the relief of the processing affected by a fixed fault of a processor, techniques described, for example, in JP-A-5-108391 and so on are known. Specifically, the disclosed method is applied to a computer system having a multiprocessor configuration, wherein an instruction so far executed by a processor affected by a fixed fault is executed by another normal processor to relieve the processing which has been once interrupted by a fault, without using embedded correction codes.

Furthermore, as the prior art related to a fault tolerant computer system having multiple processors, techniques described, for example, in JP-A-2-202636–203638 and so on are known. The disclosed techniques are such that a multiprocessor configuration is employed to multiplex processing and data to achieve a fault tolerant system.

Additionally, techniques described, for example, in JP-A-4-213736 and so on are known as further prior art techniques. This prior art describes a data processing apparatus having a dual processor configuration which is composed of an active processor and a backup processor such that when the active processor fails, the backup processor resumes the processing taken over from the active processor from the reliable latest check point.

As mentioned above, a fault tolerant computer system generally relies on a processor or software redundant configuration and a mutual diagnosis on faults to enable a backup processor to continue the processing when a fault occurs or when a processor is switched to another one. The fault tolerant computer system has a plurality of processors which run the same operating system and execute the same process to improve the reliability. However, because of its redundancy, the fault tolerant computer system has an extremely complicated system configuration.

SUMMARY OF THE INVENTION

It is an object of the present invention to provide a processor fault recovering method for a multiprocessor-based information processing system which is capable of recovering an interrupted system control program even if a fixed fault occurs in a processor which has been executing the system control program.

More specifically, it is an object of the present invention to provide a processor fault recovering method for an information processing system composed of a plurality of instruction processors for executing instruction processing and a system supporting processor having an input/output processing function and a maintenance interface function, which is capable of continuing the operation of the system, when the system supporting processor fails, by switching one of the plurality of instruction processors to a system supporting processor.

According to the present invention, the above objects are achieved by generating an interrupt from hardware through a bus line to an operating system running on at least one instruction processor when a fault occurs in the system supporting processor, recognizing in the operating system in the instruction processor that a fault has occurred in the system supporting processor, abnormally terminating an application program running on the instruction processor at the time the interrupt was generated, and substituting the instruction processor for the system supporting processor.

Also, the above objects are achieved by interrupting, in at least one instruction processor, instruction processing under execution when a fault occurs in the system supporting processor, saving processor resources required to continue the processing of a program which has been running on the instruction processor in a main storage device, entering a hardware fault state to stop the instruction processing, reporting the hardware fault to at least one instruction processor different from the instruction processor, so that the other instruction processor, upon receiving the report, forces an operating system to generate an interrupt which instructs to continue the operation of the failed instruction processor for generating a program interrupt under an operating system which is running on a processor in a hardware fault state, and substituting the instruction processor for the system supporting processor.

Further, the above objects are achieved by reporting the occurrence of the fault to at least one instruction processor, when a fault occurs in the system supporting processor, by sending a fault reporting signal to a bus line, generating an interrupt, indicative of substitution of the system supporting processor, to an operating system running on the instruction processor, the interrupt for temporarily interrupting the execution of a program running under the operating system and calling a program for interrupt processing, so that the operating system, upon receiving the interrupt, displays a system message indicating that the interrupt has been generated, and inputs a command for disconnecting an alternate instruction processor for the system supporting processor corresponding to the system message by a program which receives the system message and inputs an automatic response command to a previously registered message, and substituting the instruction processor for the system supporting processor.

Furthermore, the above objects are achieved by saving information on interrupted processing of a system control program which has been under execution in the system supporting processor when a fault occurred in the system supporting processor, detecting the occurrence of the fault in the system supporting processor by a normal instruction processor, exchanging allocation of configuration information between the failed system supporting processor and the normal instruction processor so that the normal instruction processor resumes an interrupted system control program.

BRIEF DESCRIPTION OF THE DRAWINGS

FIG. 8 is a flow chart for explaining the processing for switching a processor itself from an IP to an SSP;

FIG. 9 is a flow chart for explaining the processing for recovering the processing for sending a command to SVP;

FIG. 10 is a flow chart for explaining the processing for recovering the execution of an I/O interrupt (the processing at step 813 in FIG. 8);

FIG. 11 is a flow chart for explaining the processing for recovering the execution of an ES transfer;

FIG. 20 is a diagram for explaining details of PU configuration information which is set in the SVP;

FIG. 21 is a diagram for explaining the structure of PU information in a system control table SCT used by an SCP;

FIG. 22 is a diagram for explaining the structure of an SSP fault information saving area for saving the states of SCP processing and OS processing which have been operating when a fixed fault occurred in the SSP;

FIG. 23 is a flow chart for explaining a fault detection processing operation in a $\mu$P;

FIG. 24 is a flow chart for explaining malfunction alarm processing executed by an SCP of an IP which has detected a fixed fault in the SSP.

DESCRIPTION OF THE PREFERRED EMBODIMENTS

Embodiments of a processor fault recovering method for an information processing system according to the present invention will hereinafter be described in detail with reference to the accompanying drawings.

Figure 1:
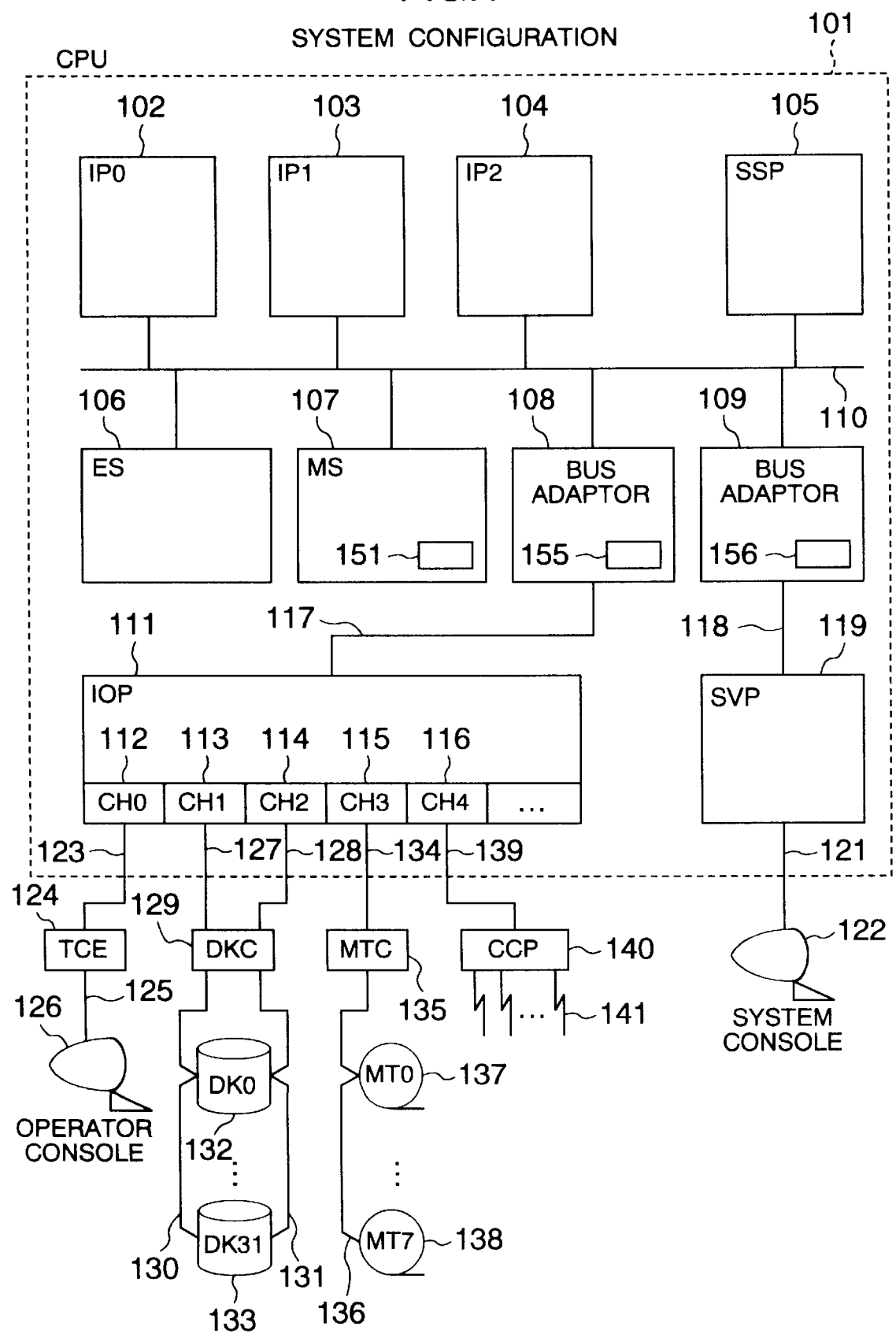
FIG. 1 is a block diagram illustrating an exemplary configuration of an embodiment of a computer system to which the present invention is applied.

FIG. 1 is a block diagram illustrating an exemplary configuration of a computer system which embodies the present invention. In FIG. 1, 101 designates a central processing unit CPU; 102–104 instruction processors IP0–IP2; 105 a system supporting processor SSP; 107 a main storage device MS; 106 an extended storage device ES; 108, 109 bus adaptors; 111 an input/output processing unit; 119 a service processor SVP; and 112 a system console.

In the illustrated computer system, the central processing unit (CPU) 101 comprises the instruction processors (hereinafter abbreviated as the "IP") 102–104; the system supporting processor (hereinafter abbreviated as the "SSP") 105; the main storage device (hereinafter abbreviated as the "MS") 107; the extended storage device (hereinafter abbreviated as the "ES") 106; the bus adaptors 108, 109; the input/output processing unit (hereinafter abbreviated as the "IOP") 111 connected to the bus adaptor 108 through a signal line 117; the service processor (hereinafter abbreviated as the "SVP") 119 connected to the bus adaptor 109 through a signal line 118; and so on.

In the foregoing, the IP 102–104 and the SSP 105 are formed of hardware having completely the same specifications, and the IPs and SSP are distinguished by a setting in a configuration table 151 provided in the MS 107. The IP refers to a processor which executes instruction processing for software such as an operating system (hereinafter abbreviated as the "OS"), application programs, and so on, while the SSP refers to a processor which is exclusively dedicated to controlling the bus adaptors 108, 109, the ES 106, and so on without executing instruction processing for software. The bus adaptors 108, 109 are provided with SSP configuration storing registers 155, 156, respectively, which are referenced to correctly direct control requests from the IOP 111, the SVP 119, and so on to the SSP 105.

The IOP 111 in turn comprises a multiplicity of input/output channel devices (hereinafter abbreviated as the "CH") 112–116 through which commands are sent to an operator console 126 connected through a terminal control unit (TCE) 124, disk drives (DK) 132–133 connected through a disk control unit (DKC) 129, a magnetic tape units (MT) 137–138 connected through a magnetic tape control unit (MTC) 135, a communication control unit (CCP) 140 connected, and so on to transmit and receive data therebetween. The SVP 119 is dedicated to initialization of the entire CPU 101, fault recovery, displays of situations for an operator, and communications with the system console 122 which receives instructions from the operator.

Figure 2:
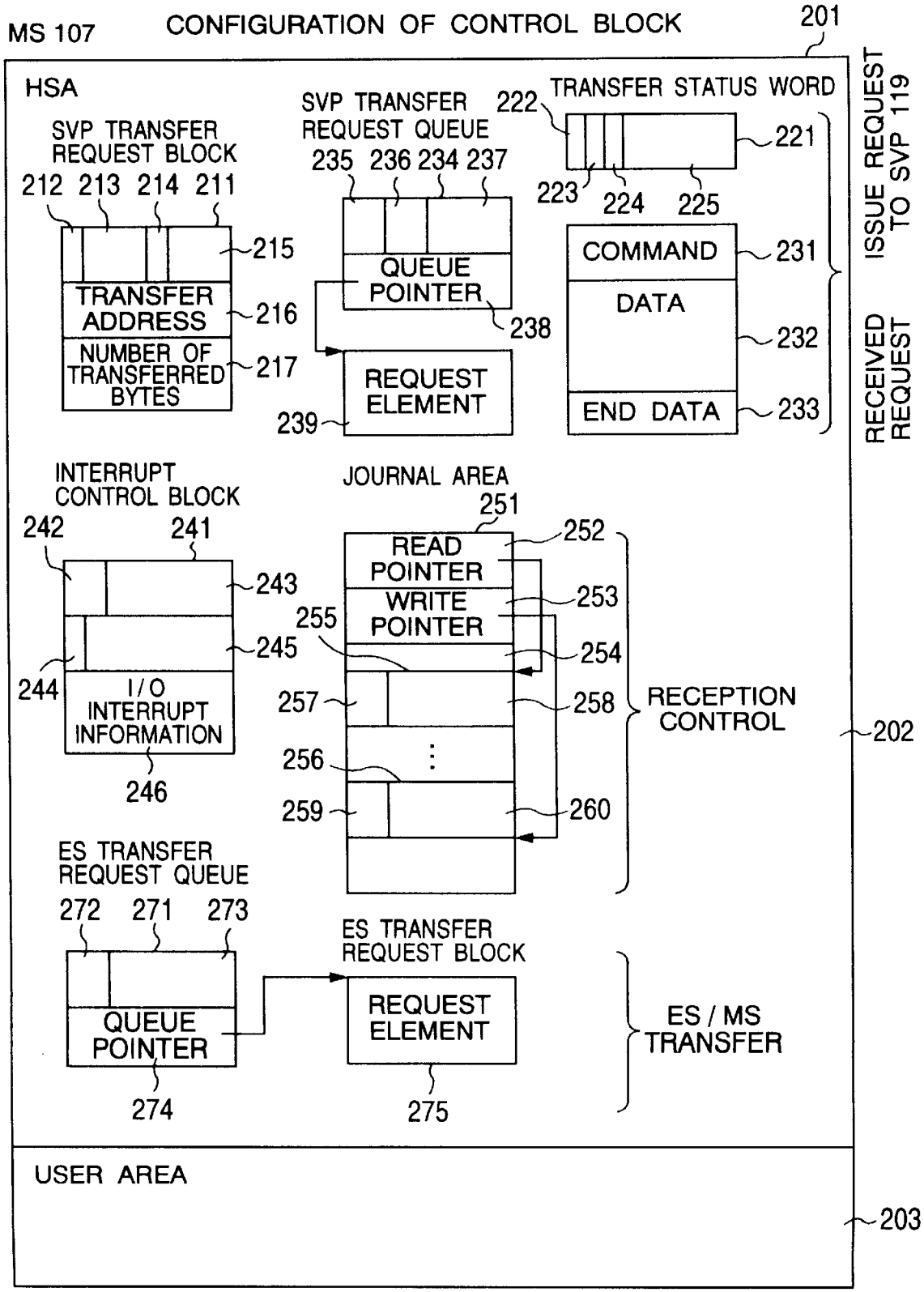
FIG. 2 is a block diagram illustrating a control block used by an SSP for performing control.

FIG. 2 illustrates the configuration of a control block which is a storage area on the MS 107 used by the SSP 105 for control. In FIG. 2, an SVP transfer request block 211, an SVP transfer request queue 234, a transfer status word 221, a transfer command 231, data 232, and end data 233 are used by the SSP 105 for issuing a request to the SVP 119 and for receiving a request from the SVP 119. An interrupt control block 241 and a journal control area 251 are used by the SSP 105 for controlling the reception of a request from the IOP 111, while an ES transfer request queue 271 is used for controlling the execution of a data transfer request between the ES 106 and the MS 107.

Next, each area in the control block mentioned above will be explained in detail.

The SVP transfer request block 211 has a transfer completion flag 212 which is changed from "0" to "1" when a transfer is completed after reception processing has been invoked by an invoke instruction given to the bus adaptor 109; a transfer completion flag 214 which is changed from "0" to "1" when a transfer is completed after transmission processing has been invoked by an invoke instruction given to the bus adaptor 109; a transfer address 216 on the MS 107 to which data to be transmitted or received is to be transferred; a field 217 for storing the number of transferred bytes indicative of the length of data; and unused fields 213, 215. The request block 211 is referenced when issuing an instruction for activating the bus adaptor 109 which is used by a program running on the SSP 105 for transmitting and receiving data to and from the SVP 119.

The SVP transfer request queue 234 is composed of a lock byte 235 for purposes of an exclusive control when a request element 239 is registered in the queue; a resume display byte 236 indicating certain processor under execution, the element of which has been removed from the queue, but which must be resumed even after the processing is once interrupted; an empty field 237; and a queue pointer 238 indicative of the address of the queue element 239 indicating the kind of a request.

The command 231, the data 232, and the end data 233 define a unit of a data block to be transferred by an invoke instruction issued to the bus adaptor. The SSP 105 must issue a bus adaptor activation instruction each time data is transmitted or received.

The transfer status word 221 is composed of a command bit 222 indicating that the command 231 is being transferred; a data bit 223 indicating that the data 232 is being transferred; an end data bit 224 indicating that the end data 233 is being transferred; and an empty field 225.

The interrupt control block 241 is composed of a lock byte 242 for exclusively controlling updates of this control block 241; an ES interrupt bit 244; an I/O interrupt information field 246; and empty fields 243, 245.

The journal area 251 is composed of a read pointer 252 for reading an entry which contain the oldest valid journal; a write pointer 253 for writing a new journal; and journal records 255, 256. The journal record is composed of journal types 257, 259, parameters 258, 260, and so on.

The ES transfer queue 271 is composed of a lock byte 272; a queue pointer 274 indicative of a request element 275; and an empty field 273.

The respective areas of the control block mentioned above are allocated on a hardware system area (HSA) 202 in the MS 201 which is divided into the HSA 202 and a user area 203.

Figure 3:
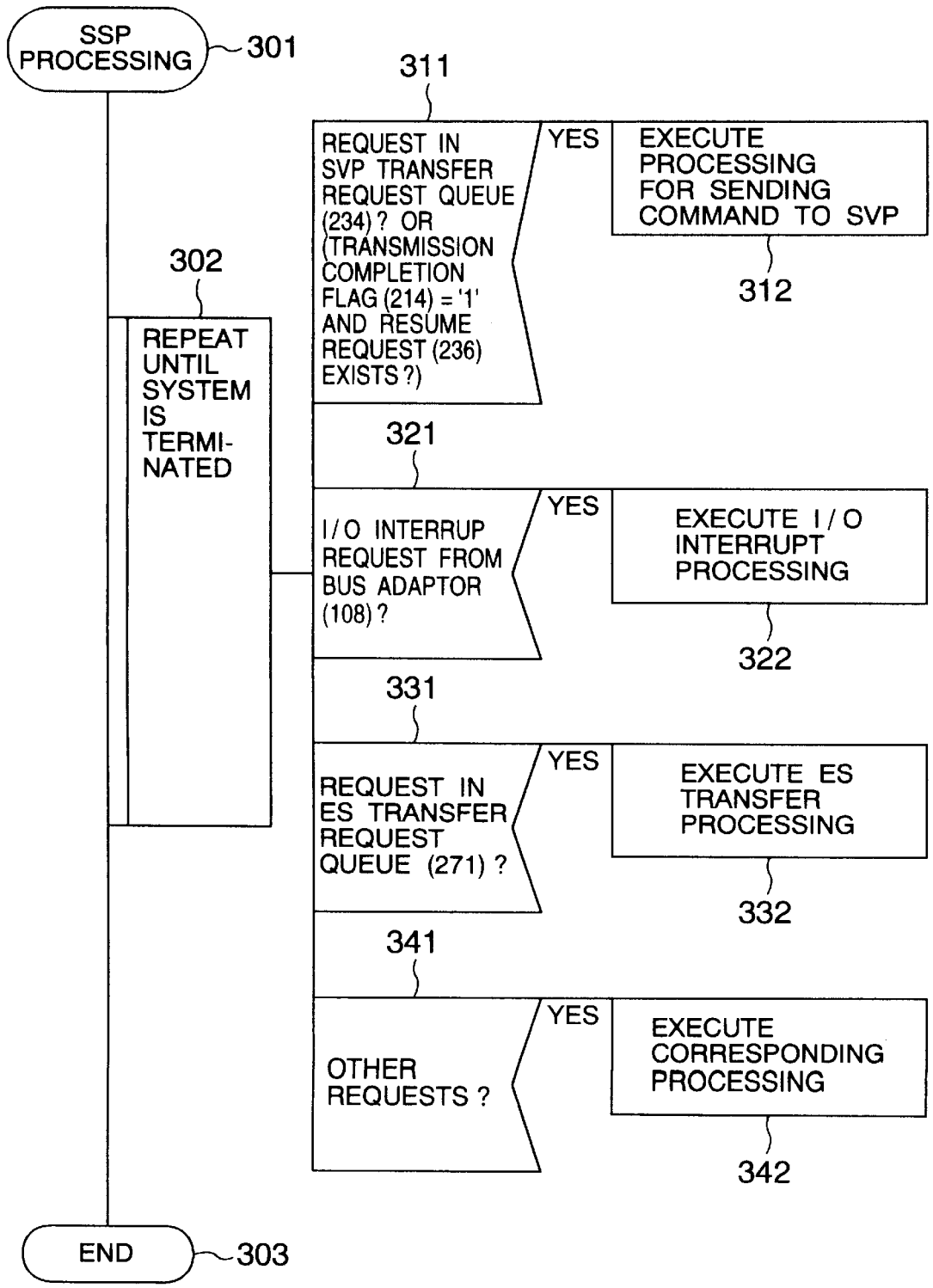
FIG. 3 is a flow chart for explaining a normal processing operation of the SSP.

FIG. 3 is a flow chart for explaining a normal processing operation of the SSP 105. In the following, the normal processing operation of the SSP 105 will be explained with reference to FIG. 3.

(1) The processing executed in the SSP 105, explained below, begins when the computer system 1 illustrated in FIG. 1 is activated, repeats a loop for waiting for a processing request while monitoring the presence or absence of a processing request until the computer system is terminated, and is terminated together with the termination of the computer system (steps 301–303)

(2) First in monitoring the presence or absence of a processing request at step 302, it is checked whether or not the SVP transfer request queue 234 contains a request, or whether the transmission completion flag 214 is at "1" and whether the resume request byte 236 is at "1". If the conditions are satisfied, the SSP 105 executes command sending processing for sending a command to the SVP 119 (transferring a data transfer command and a data field associated therewith to the SVP) (steps 311, 312).

(3) Second in monitoring the presence or absence of a processing request at step 302, it is checked whether or not an I/O interrupt request is issued from the bus adaptor 108. If an I/O interrupt request is issued, the SSP 105 executes I/O interrupt processing (steps 321, 322).

(4) Third in monitoring the presence or absence of a processing request at step 302, it is checked whether or not a processing request has been transferred to the ES transfer request queue 271 from an IP. If a processing request from an IP has been transferred, ES transfer processing is executed (steps 331, 332).

(5) Further at step 302, other requests are also checked in a manner similar to the above mentioned, and corresponding processing is executed if a request has been issued (steps 341, 342).

Figure 4:
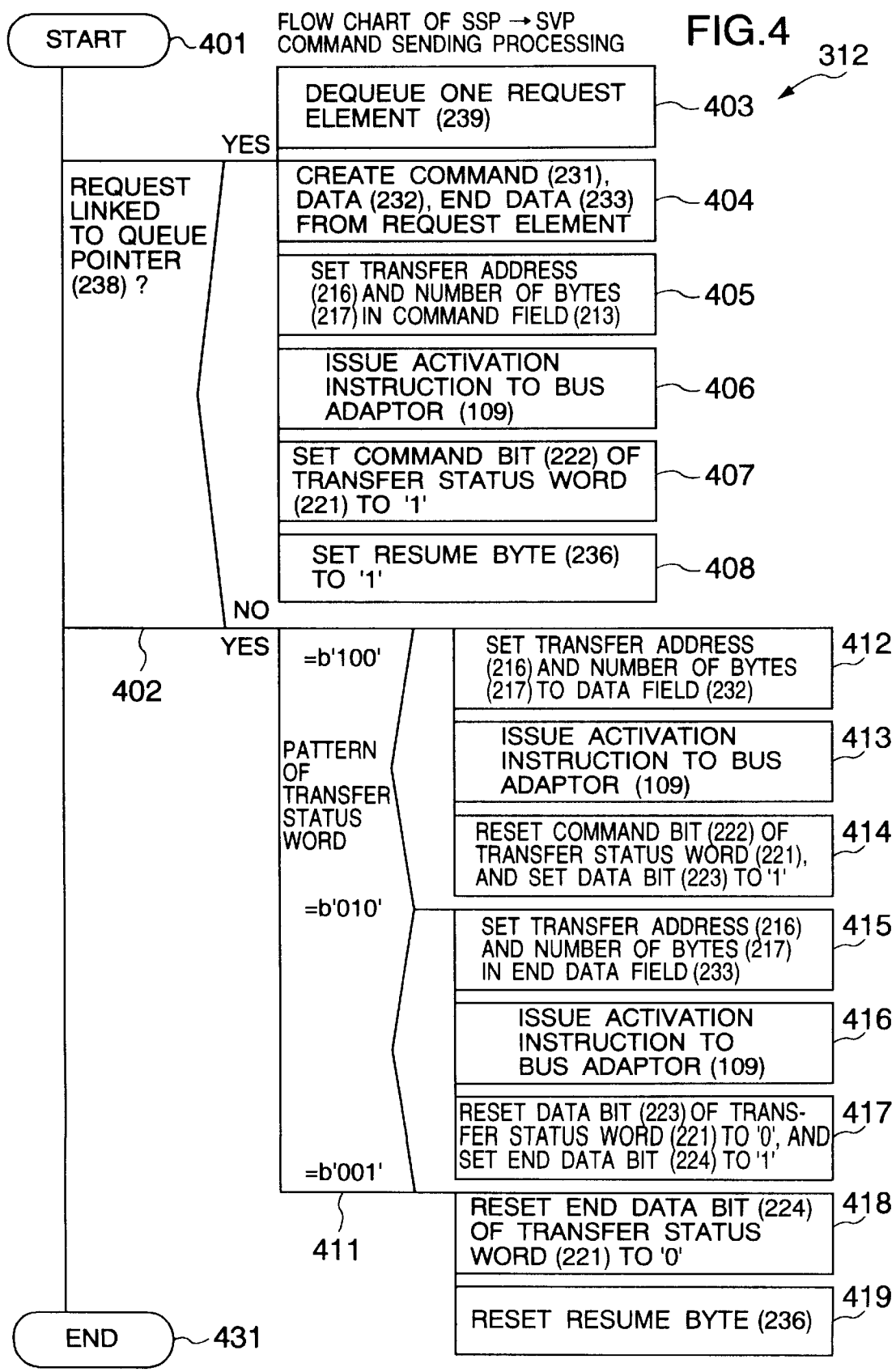
FIG. 4 is a flow chart for explaining a detailed operation of the processing for sending a command to an SVP (step 312 in FIG. 3)

FIG. 4 is a flow chart for explaining detailed operations of the SSP-to-SVP command sending processing (step 312 in FIG. 3). In the following, the command sending processing for sending a command from the SSP 105 to the SVP 119 will be explained in detail with reference FIG. 4.

(1) When the command sending processing is started, it is first checked whether or not a request element 239 is linked to the queue pointer 238. If linked, the request element 239 is dequeued (steps 401–403).

(2) Then, the contents of the request element 239 to be transmitted to the SVP 119 are written into the control block. Specifically, the contents of a command is written into the command field 231, the contents of data are written into the data field 232, and the contents of end data are written into the end data field 233 (step 404).

(3) Next, the address of data 231 is set to the transfer address 216, the number of bytes of the data is set in the number of transferred bytes 217, and an activation instruction is issued to the bus adaptor 109 (step 406).

(4) Since a relatively long time is required until the data transfer is completed after the bus adaptor 109 has been activated, the SSP 105 sets the command bit 222 of the transfer status word 221 to "1" and the resume byte 236 to "1" for once exiting the transmission processing and resuming where it was interrupted (steps 407, 408).

(5) When a data transfer has been completed and the next data transfer is to be executed, the processing illustrated in FIG. 4 is entered again without request element. Therefore, if it is determined at step 402 that no request element is linked to the queue pointer 238, the pattern of the first three bits in the transfer status word 221 are checked (step 411).

(6) If the check at step 411 indicates that the bit pattern is "100", this means that the command has been completely transferred. Thus, the transfer address 216 and the number of bytes 217 are next set in the data field 232. Subsequently, an activation instruction is issued to the bus adaptor 109, the command bit 222 of the transfer status word 221 is set to "0", and the data bit 223 is set to "1" (steps 412–414).

(7) If the check at step 411 indicates that the bit pattern is "010", this means that the data field has been completely transferred. Thus, the transfer address 216 and the number of bytes 217 are next set in the end data field 233, an activation instruction is issued to the bus adaptor 109, the data bit 223 of the transfer status word 221 is set to "0", and the end data bit 224 is set to "1" (steps 415–417).

(8) If the check at step 411 indicates that the bit pattern is "001", this means that the end data field has been completely transferred. Thus, the end data bit 224 of the transfer status word 221 is next reset to "0", and the resume byte 236 is reset to "0" (steps 418, 419).

Figure 5:
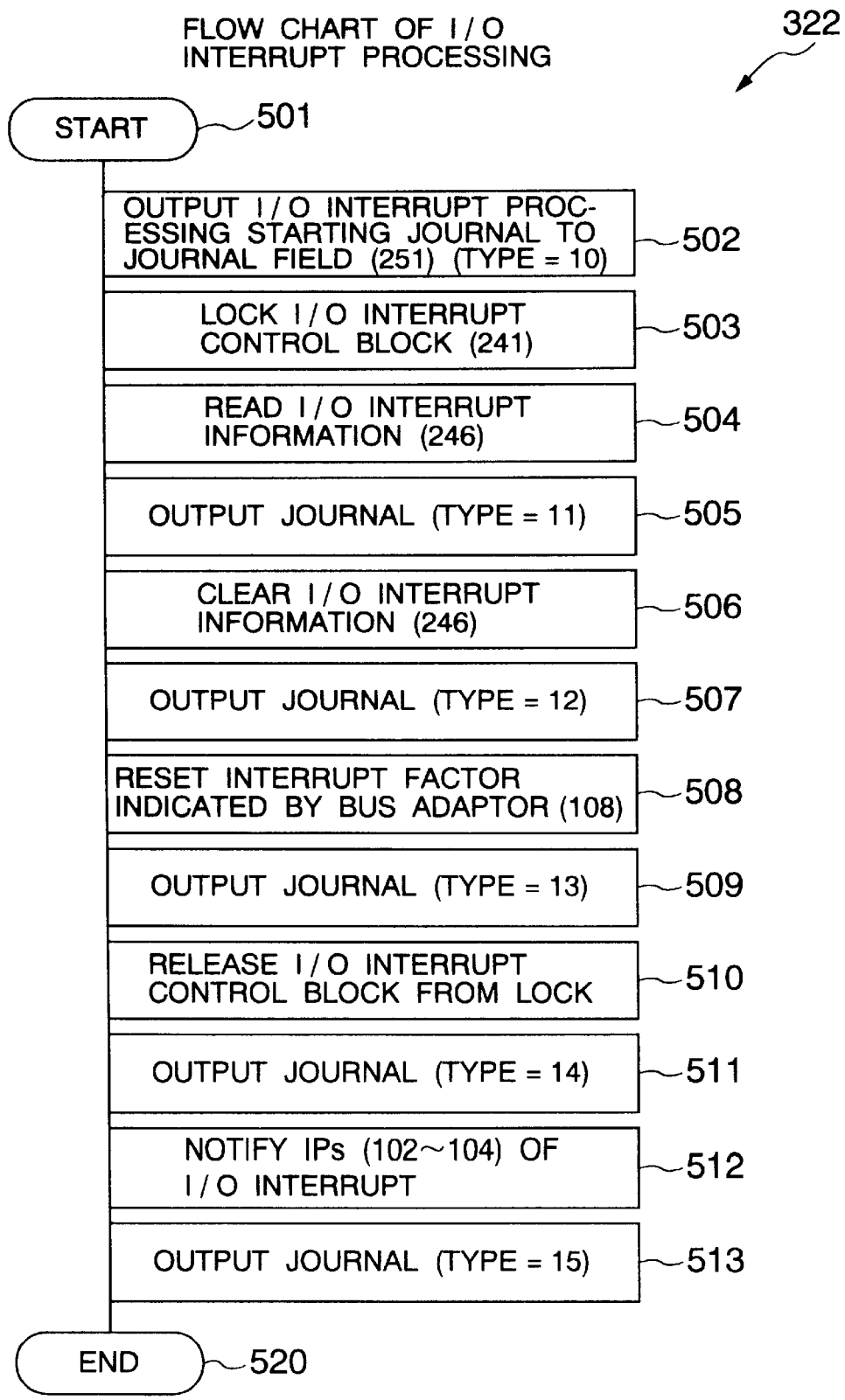
FIG. 5 is a flow chart for explaining I/O interrupt processing (step 322 in FIG. 3) executed by the SSP 105.

FIG. 5 is a flow chart for explaining the I/O interrupt processing (step 322 in FIG. 3) executed by the SSP 105. In the following, the I/O interrupt processing executed by the SSP 105 will be explained with reference to FIG. 5.

(1) When this processing is invoked by a request from the bus adaptor 108, an I/O interrupt processing starting journal having a journal type set at "10" is outputted to the journal area 251 (steps 501, 502).

(2) Next, the I/O interrupt control block 241 is locked, the I/O information 246 is read, a journal having a journal type set at "11" is outputted, the I/O interrupt information 246 is cleared, and a journal having a journal type set at "12" is outputted (steps 503–507).

(3) Subsequently, an interrupt factor bit indicated by the bus adaptor 108 is reset, a journal having a journal type set at "13" is outputted, and the I/O interrupt control block 241 is released from the lock (steps 508–510).

(4) Next, a journal having a journal type set at "14" is outputted, the I/O interrupt is informed to the IPs 102–104, and a journal having a journal type set at "15" is outputted, followed by the termination of the processing (steps 511–513, 520).

Figure 6:
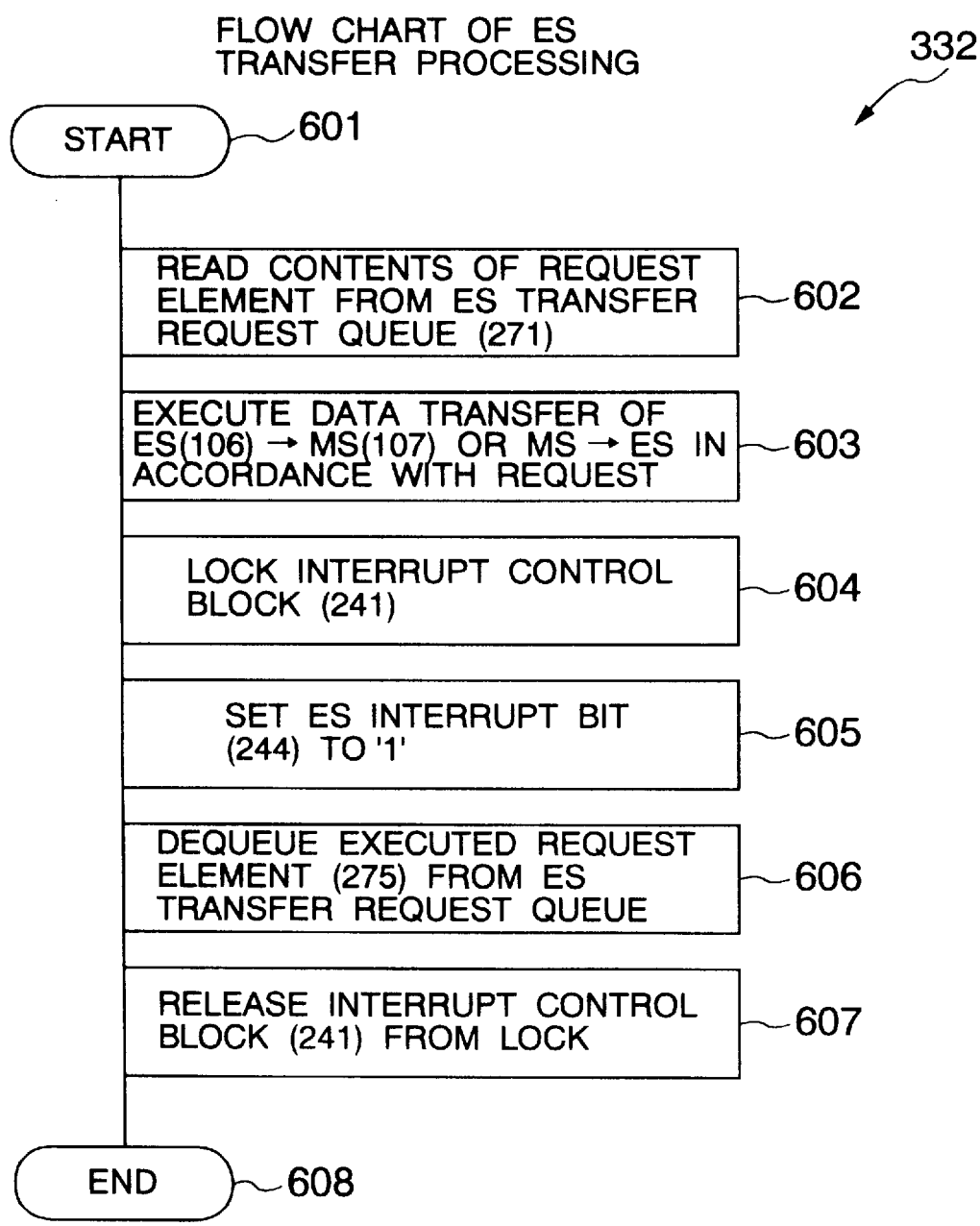
FIG. 6 is a flow chart for explaining ES transfer processing (step 332 in FIG. 3) executed by the SSP.

FIG. 6 is a flow chart for explaining the ES transfer processing (step 332 in FIG. 3) executed by the SSP 105 for transferring data between the MS and the ES. In the following, the ES transfer processing executed by the SSP 105 will be explained with reference to FIG. 6.

(1) When this processing is invoked, the contents of a request element 275 are read from the ES transfer request queue 271, and a data transfer from the ES 106 to the MS 107 or from the MS 107 to the Es 106 is executed in accordance with the request (steps 601–603).

(2) Next, the interrupt control block 241 is locked, and the ES interrupt bit 244 is set to "1" (steps 604, 605).

(3) Then, an executed request element 275 is dequeued from the ES transfer request queue 271, and the interrupt control block 241 is released from the lock, followed by the termination of the processing (steps 606–608).

While the normal processing operation, when the SSP 105 is normal, has been discussed above, operations performed when a fault occurs in the SSP 105 will be next explained.

Figure 7:
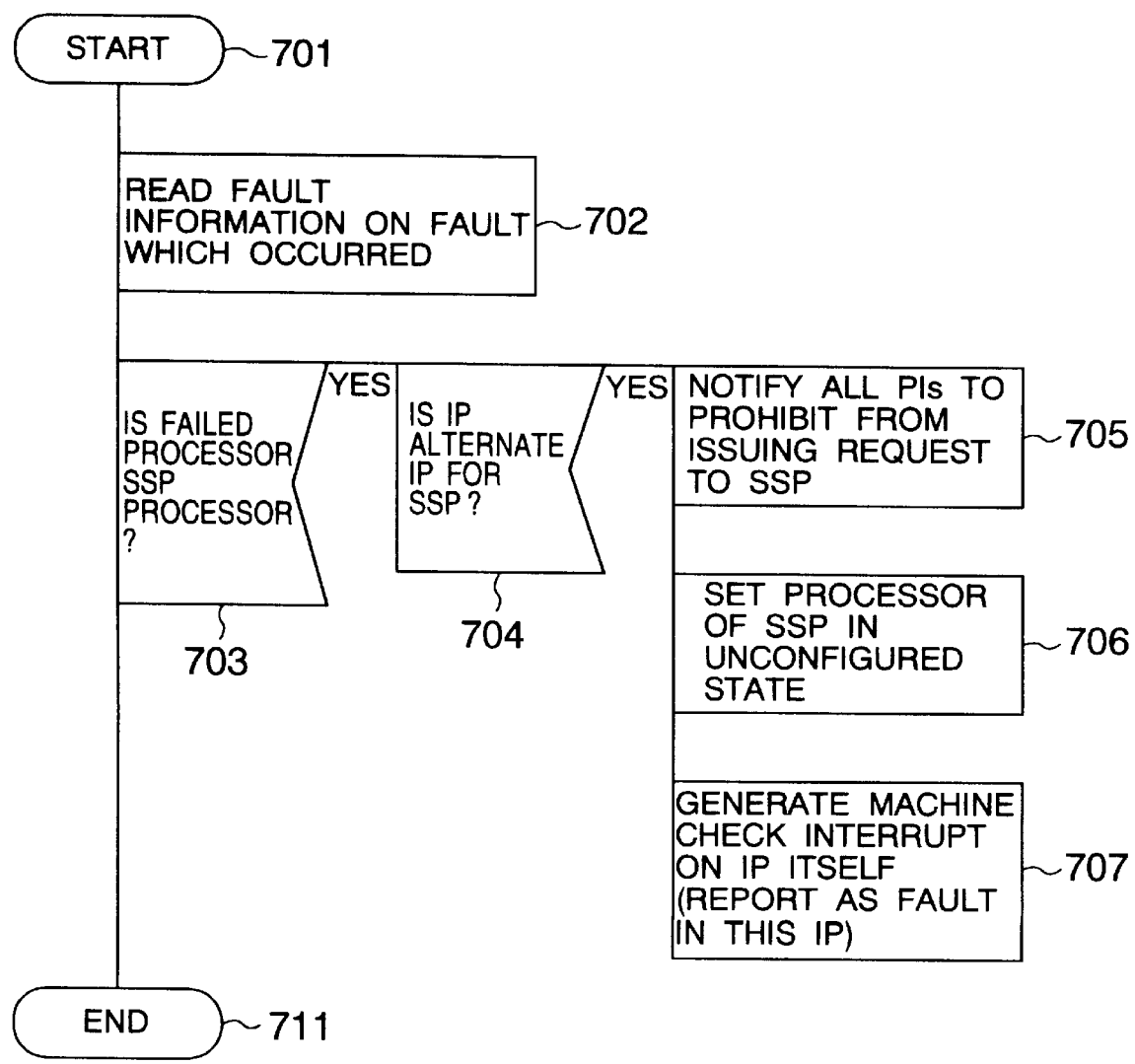
FIG. 7 is a flow chart for explaining the operation of an alternate IP when the SSP fails.

FIG. 7 is a flow chart for explaining the operation of an alternate IP when the SSP fails. In the following, this operation will be explained.

(1) When the SSP 105 fails, the hardware of the SSP notifies all the IPs 102–104 of the occurrence of a fault through the bus 110, and invokes fault processing of the respective IPs (step 701).

(2) An invoked fault processing microprogram in each IP reads information on the fault, and checks whether or not the failed processor is the SSP and whether or not the associated processor is an alternate IP for the SSP (steps 702–704).

(3) If the checks at steps 703 and 704 determine that the failed processor is the SSP, and that the associated IP is an alternate IP for the SSP, the IP itself sends a message to prohibit all of the other IPs from issuing an request to the SSP (step 705).

(4) The IP also updates the configuration information 151 for disconnecting the processor of the SSP from the system configuration, and the IP itself reports to the OS a machine check interrupt which indicates the necessity of urgent fault processing against a hardware fault (steps 706, 707).

The OS, responsive to the machine check interrupt, checks the contents of the fault to determine that this IP cannot execute software, and issues an offline instruction to the IP. The microprogram of the IP disconnected thereby starts an operation for changing the IP itself to an SSP. When two or more IPs are used to substitute for the SSP, the first activated IP executes all of steps 701–711, and the other IP executes the remaining steps except for steps 705, 706.

FIG. 8 is a flow chart for explaining the processing for changing a processor from an IP to an SSP. In the following, this processing will be explained.

(1) When this processing is invoked by the IP offline instruction issued by the OS which is software installed in the MS user area, the IP is changed to an offline state, and it is checked whether or not the IP itself is an alternate processor for substituting for the SSP (steps 801–803).

(2) If the check at step 803 indicates that the processor is an alternate processor, the processor registers itself as the SSP in the configuration information 151, and registers the number of the processor in an SSP register 155 of the bus adaptor 156 and in an SSP register 156 of the bus adaptor 155 (steps 804–806).

(3) Then, a recovery of the command sending processing is executed, a recovery of the I/O interrupt processing is executed, a recovery of the ES transfer processing is executed, and a recovery of other processing is executed (steps 811–814).

(4) When the processing up to the foregoing steps has been finished, a message is notified to all the IPs to permit them to issue a request to the SSP (step 815).

When two or more IPs are used to substitute for the SSP, the respective IPs execute their allotted portions of the recovery processing from step 804 to step 814. When all the recovery processing from step 804 to 814 has been completed, one of the IPs executes the step 815.

FIG. 9 is a flow chart for explaining the processing for recovering the processing for sending a command to the SVP (step 811 in FIG. 8). In the following, this processing will be explained.

(1) When this processing is invoked, the transfer status word 221 is read to check the pattern of the three most significant bits of the transfer status word, and the flow proceeds to processing for executing the recovery processing corresponding to the pattern (steps 901–903).

(2) If the bit pattern detected at step 903 is "000", it is checked whether or not there exists a request element which remains dequeued from the queue 234 and leaves the bus adaptor 109 in an inactivated state (step 911).

(3) If the check at step 911 indicates that there is a request element which leaves the bus adaptor 109 in an inactivated state, a command 231, data 232, and end data 233 are created from the request element, the transfer address 216 and the number of transferred bytes 217 are set in the command field 231, and an activation instruction is issued to the bus adaptor 109 (steps 912–914).

(4) Next, the command bit 222 of the transfer status word 221 is set to "1", and the resume byte 236 is set to "1" (step 916).

(5) If the bit pattern detected at step 903 is "100", it is confirmed that the transfer completion flag 214 is at "1" and the bus adaptor 109 has been activated. Then, the command bit 222 of the transfer status word 221 is set to "0", and the data bit 223 is set to "1" (steps 921–923).

(6) If the bit pattern detected at step 903 is "010", the transfer completion flag 214 is checked to see whether or not it is "1". If "1", it is checked whether or not the bus adaptor 109 has been activated. If activated, the data bit 223 of the transfer status word 221 is reset to "0", and the end data bit 224 is set to "1" (steps 931–933).

(7) If the bit pattern detected at step 903 is "001", the processing is terminated without any action (step 951).

FIG. 10 is a flow chart for explaining the recovery processing for the I/O interrupt execution (step 812 in FIG. 8). In the following, this processing will be explained.

(1) When this processing is invoked, the journal 251 is searched in a reverse order from a record pointed by the write pointer 253 to a record pointed by the read pointer 252 to find records having a journal type which is "10" or more and "14" or less (steps 1001–1003).

(2) If the maximum value of the journal type found at step 1003 is "14", an I/O interrupt is notified to the IPs 102–104 (steps 1004, 1012).

(3) If the maximum value of the journal type found at step 1003 is "13", the I/O interrupt control block is released from a lock, and thereafter the IP's are notified of an interrupt (steps 1005, 1011, 1012).

(4) If the maximum value of the journal type found at step 1003 is "12", an interrupt factor for the bus adaptor 108 is reset, the interrupt control block is thereafter released from a lock, and the IPs 102–104 are notified of an interrupt (steps 1006, 1010–1012).

(5) If the maximum value of the journal type found at step 1003 is "11", the I/O interrupt information 246 is cleared, an interrupt factor for the bus adaptor 108 is reset, the interrupt control block is released from a lock, and the IPs 102–104 are notified of an interrupt (steps 1007, 1009–1012).

(6) If the maximum value of the journal type found at step 1003 is "10", the I/O interrupt control block is locked, the I/O interrupt information 246 is cleared, an interrupt factor for the bus adaptor 108 is thereafter reset, the interrupt control block is released from a lock, and the IPs 102–104 are notified of an interrupt (steps 1007, 1009–1012).

FIG. 11 is a flow chart for explaining the processing for recovering the execution of an ES transfer (processing at step 813 in FIG. 8). In the following, this processing will be explained.

(1) When this processing is invoked, it is first checked whether or not there is a request element which has been read from the ES transfer request queue. If so, it is next determined whether nor not the interrupt control block is locked (steps 1101–1103).

(2) If it is determined at step 1103 that the interrupt control block is locked, the ES interrupt bit 244 is set to "1", the executed request element 275 is removed from the ES transfer request queue, and the interrupt control block 241 is released from a lock (steps 1104–1106).

In the foregoing exemplary operations according to this embodiment of the present invention, the IP which substitutes for the failed SSP stops the processing so far executed by itself. In the following, explanation will be given of SSP substitution processing which allows an alternate processor to continue its process.

Figure 12:
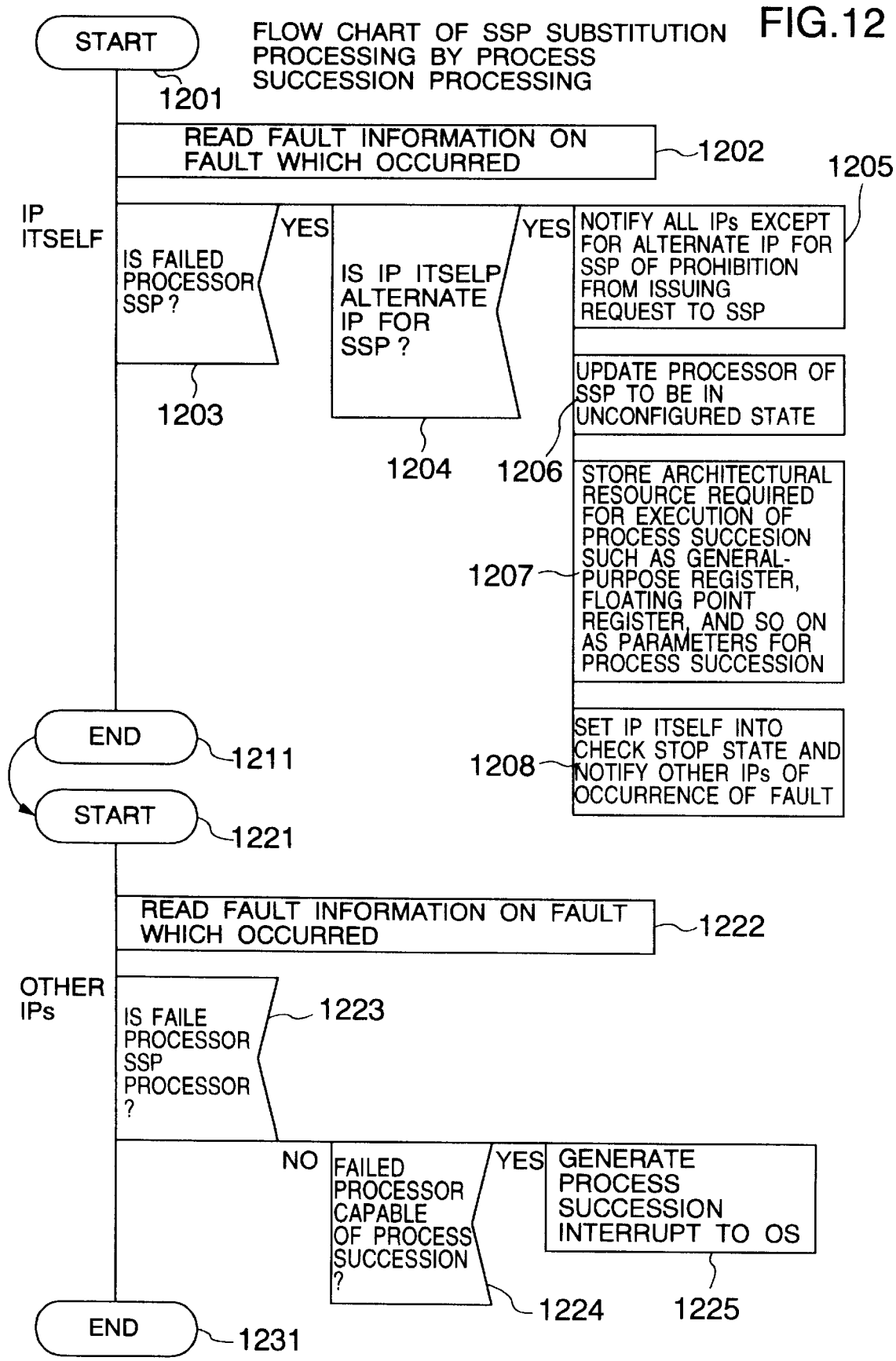
FIG. 12 is a flow chart for explaining the operation of an alternate IP which can continue the process of an alternate IP when the SSP fails.

FIG. 12 is a flow chart for explaining the operation of an alternate IP which can continue its process when the SSP fails. In the following, this operation will be explained.

(1) As is the case of the processing explained above with reference to FIG. 7, an IP, upon receiving a fault notice from the SSP, reads a program status word (PSW) of a program, which has been under execution at the time the IP received the fault notice, and a general-purpose register from a PSW saving area and a general-purpose register saving area, respectively, as parameters for process succession, and stores them in a parameter area for process succession on the HSA. Next, the values of a CPU timer, a clock comparator, a control register, a floating point register, an access register, and a prefix register are directly read and stored in the parameter area. Then, if these parameter storing operations are all successful, the CPU address, which is the number of the IP itself, and a process succession valid flag are stored in the parameter area (step 1201).

(2) Next, the IP reads fault information on the fault which has been occurred, and checks whether or not the failed processor is the SSP and the IP itself is an alternate IP for the SSP (steps 1201–1204).

(3) If the checks at steps 1203, 1204 determine that the failed processor is the SSP and the IP itself is an alternate IP, the IP notifies all the IPs of a message for prohibiting them from issuing a request to the SSP (step 1205).

(4) The IP also updates the configuration information 151 to be in an unconfigured state in order to disconnect the processor of the SSP from the system configuration (step 1206).

(5) Next, the IP stores architectural resources required to continue the processes of software which has been under execution (process succession), such as the general-purpose register, the floating point register, and so on, as parameters for process succession, sets itself into a check stop state, and reports to the other IPs a fault occurring in the IP itself (steps 1207, 1208).

(6) The other IPs, which have received the report on the occurrence of the fault from the IP which substitutes for the SSP, first read fault information, confirm that the failed processor has stored information required for the process succession as parameters, and generate a process succession interrupt to the OS which is running in the respective IPs themselves (steps 1221–1225).

Figure 13:
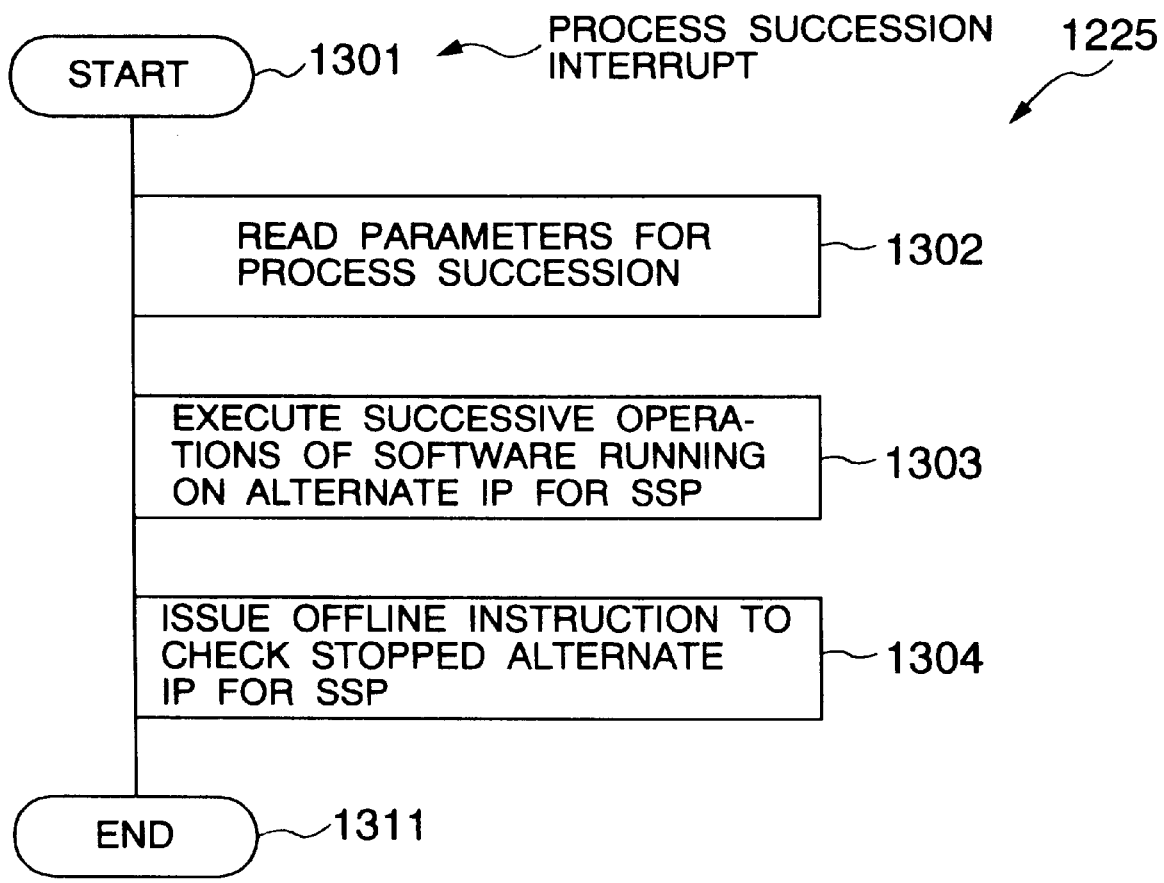
FIG. 13 is a flow chart for explaining the processing of an OS which has received a process succession interrupt.

FIG. 13 is a flow chart for explaining the processing of the OS which has received the process succession interrupt. In the following, this processing will be explained.

(1) The OS, upon receiving the process succession interrupt at the foregoing step 1225, reads the parameters for the process succession, and executes successive operations of software which has been running on the alternate IP for the SSP (steps 1301–1303).

(2) Next, an offline instruction is issued to the check stopped alternate IP for the SSP. In this way, the alternate IP for the SSP executes the processing for changing the IP itself to the SSP previously explained with reference to FIG. 8, so that the IP can operate as the SSP (step 1304).

Figure 14:
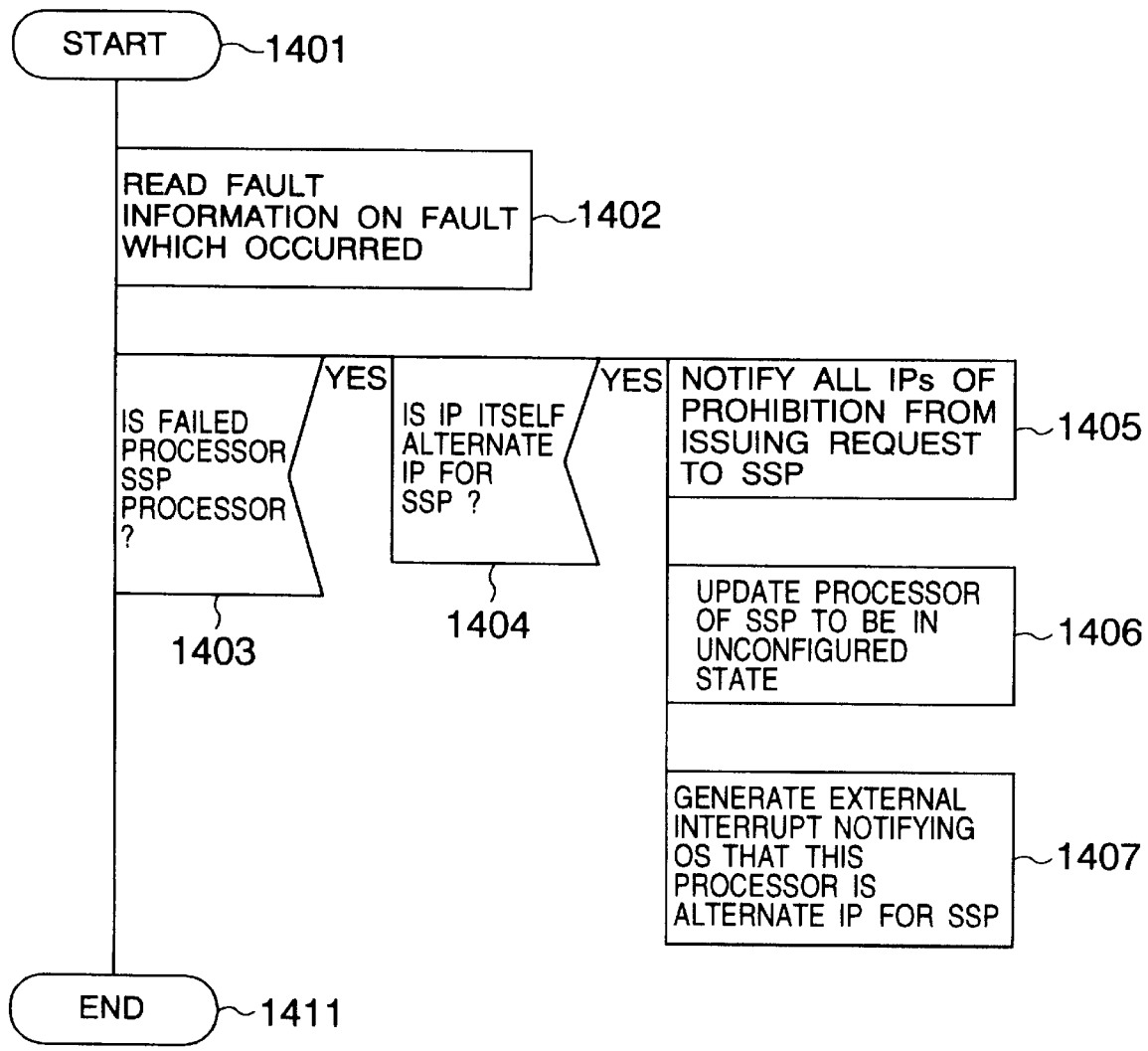
FIG. 14 is a flow chart for explaining the processing for recovering an SSP fault utilizing an automatic message response function of the operating system as another example of SSP substitution processing.

FIG. 14 is a flow chart for explaining the processing for recovering the failed SSP utilizing an automatic message response of the OS as another processing example of the SSP substitution processing. In the following, this recovery processing will be explained.

(1) As is the case of the processing explained above with reference to FIG. 7, an IP, upon receiving a fault notice from the SSP, reads fault information on the fault, and checks whether or not the failed processor is the SSP and the IP itself is an alternate processor for the SSP (steps 1401–1404).

(2) If the checks at steps 1403, 1404 determine that the failed processor is the SSP and the IP itself is an alternate IP, the IP notifies all the IPs of a message for prohibiting them from issuing a request to the SSP (step 1405).

(3) Next, the IP updates the configuration information 151 to be in an unconfigured state in order to disconnect the processor of the SSP from the system configuration, and generates an external interrupt which notifies the OS of the IP itself that this processor is an alternate IP for the SSP (steps 1406, 1407). When two or more IPs are used to substitute for the SSP, the first activated IP executes all of steps 1401–1411, and the other IP executes the remaining steps except for steps 1405, 1406.

Figure 15:
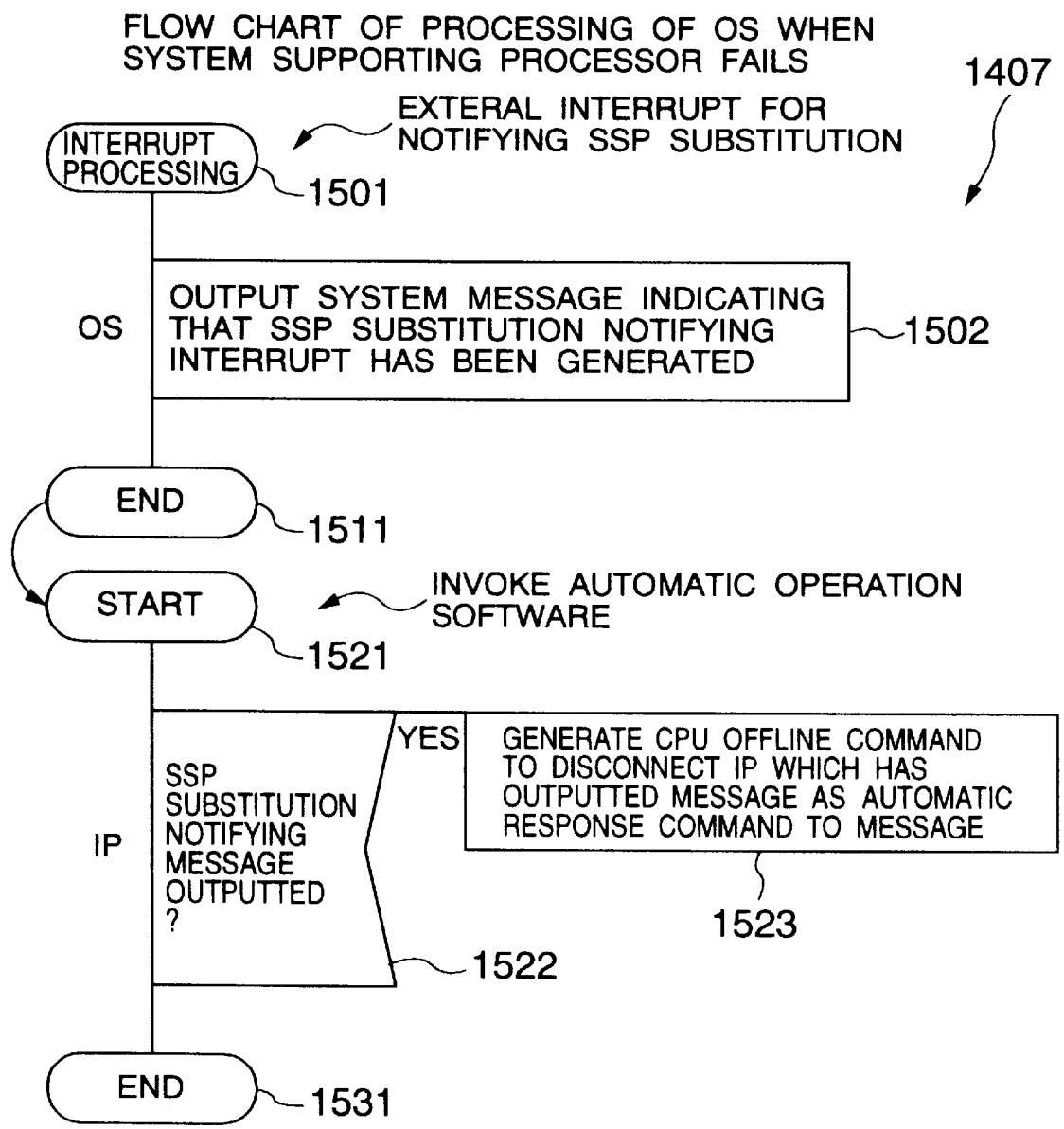
FIG. 15 is a flow chart for explaining the processing of the operating system which has received an external interrupt at step 1407 in FIG. 14.

FIG. 15 is a flow chart for explaining the processing of the OS which has received the external interrupt at the foregoing step 1407. In the following, this processing will be explained.

(1) The OS, upon receiving the external interrupt notifying the substitution of the SSP at the foregoing step 1407, first executes an interrupt processing routine to output to the operator console a system message which indicates that the SSP substitution notifying interrupt has been generated (steps 1501, 1502).

(2) This software message invokes automatic operation software to check whether or not the contents of the system message is an SSP substitution message (steps 1521, 1522).

(3) If the contents of the system message is the SSP substitution message (when the SSP substitution notifying message is displayed, a command is inputted to disconnect the IP which has outputted the message), a CPU offline command is generated to disconnect the IP which has outputted the message, as an automatic response command to the message. In this way, the alternate IP for the SSP executes the processing previously explained with reference to FIG. 8, so that the alternate IP can operate as the SSP (step 1523).

According to the embodiment of the present invention described above, only if the control block is provided in the HAS of the MS as illustrated in FIG. 2, one of the IPs can be substituted for the SSP when it fails. Other than for the substitution of the SSP, such a substitution method may also be utilized for recovering a fault of a particular processor when respective processors in a memory-shared multiple processor configuration are running software having different functions.

While three kinds of methods for substituting for the system supporting processor have been described above, the present invention can previously register these methods in a system supporting processor substitution mode storage area in a computer system, such that a substitution mode stored in the storage area is invoked to start a substitution operation when the system supporting processor fails.

While the embodiment of the present invention described above is such that the SSP is substituted without holding process succession information of the SSP itself, another embodiment of the present invention will next be explained in which the SSP is substituted while the process succession information thereof is held in the SSP itself. In this embodiment, a bit of hardware must be added to the SSP, the IPs, and the SVP.

Figure 16:
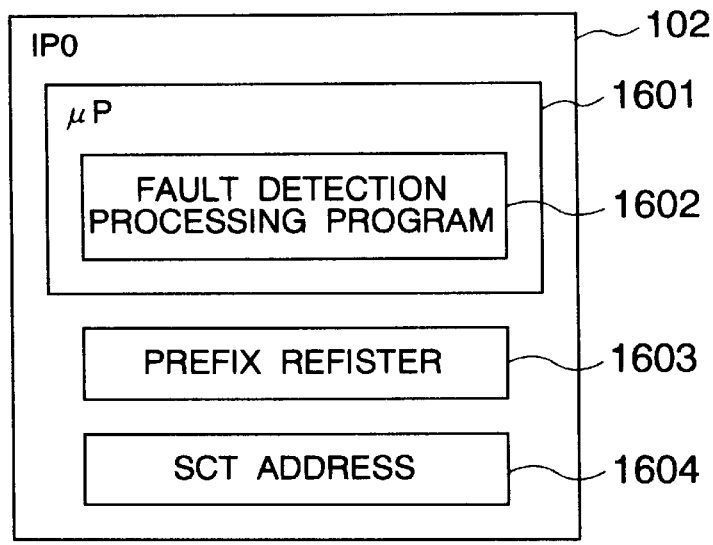
FIG. 16 is a block diagram illustrating the internal configuration of an IP on which the operating system runs.

FIG. 16 is a block diagram illustrating the internal configuration of an IP which runs an OS. In FIG. 16, 1601 designates a $\mu$P which operates on the processor; 1602 a fault detection processing program; 1603 a prefix register of the processor; and 1604 a system control table address preservation register. All of IPs 102–104 are formed of these components.

Figure 17:
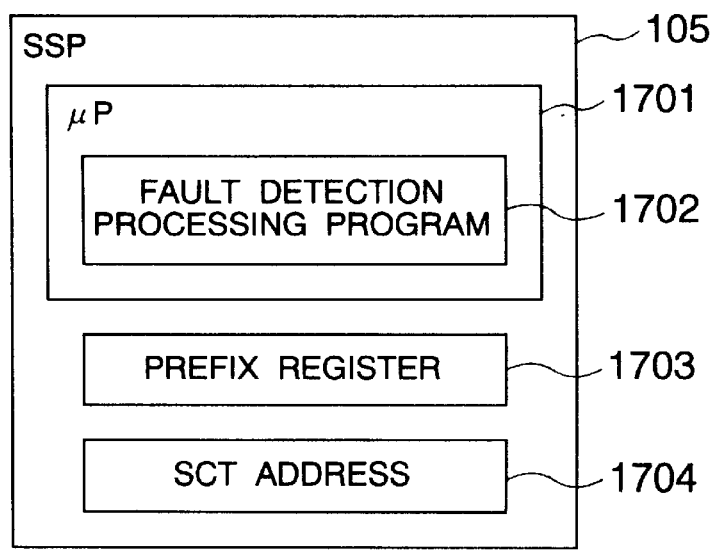
FIG. 17 is a block diagram illustrating the internal configuration of the SSP which controls internal operations of the computer.

FIG. 17 is a block diagram illustrating the internal configuration of the SSP which controls internal operations of the computer. In FIG. 17, 1701 designates a $\mu$P which operates on the processor; 1702 a fault detection processing program; 1703 a prefix register of the processor; and 1704 a system control table address preservation register. The SSP 105 is formed of these components.

Figure 18:
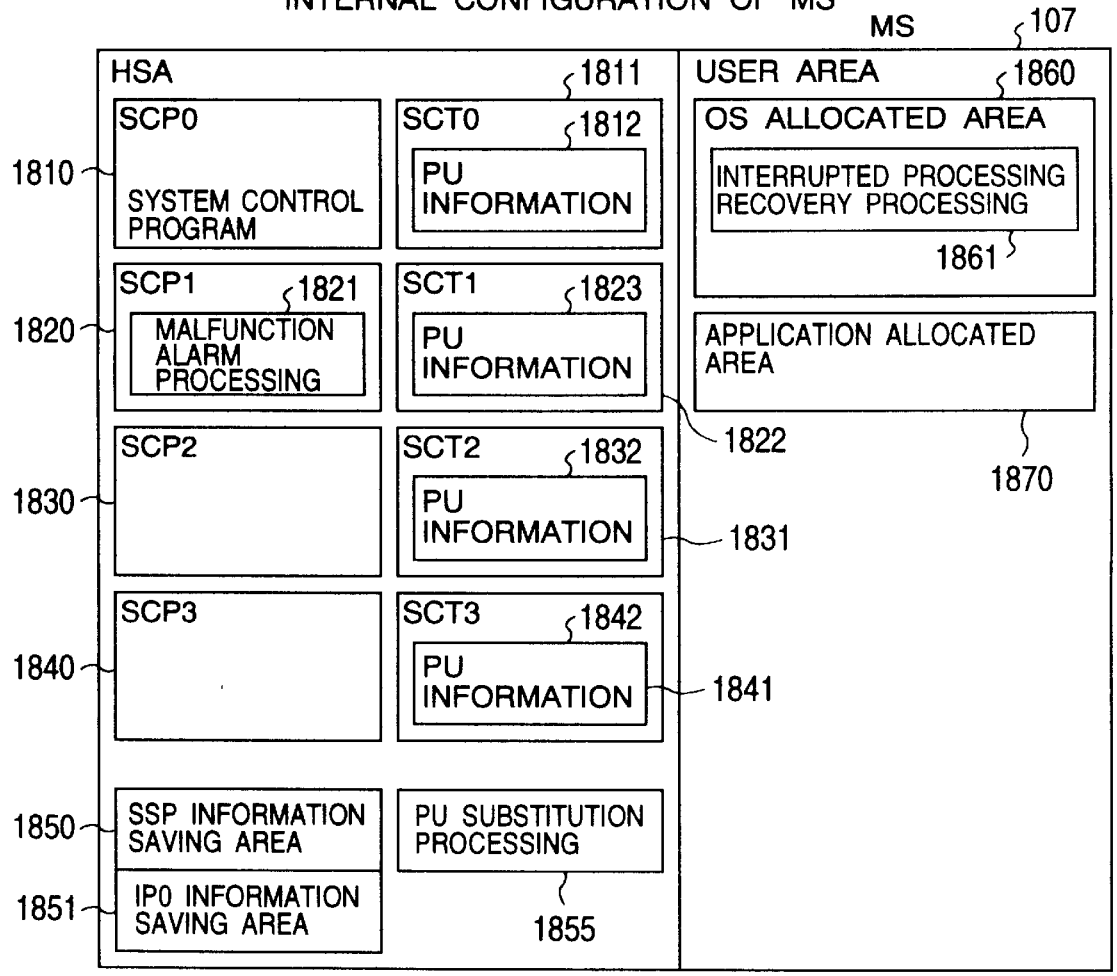
FIG. 18 is a diagram for explaining the internal configuration of a MS.

FIG. 18 is a diagram for explaining the internal configuration of an MS. In FIG. 18, 1810, 1820, 1830, 1840 are system control programs (SCP0–SCP3) which run on the SSP and the IP0–IP2, respectively; 1821 a malfunction alarm processing program executed when a fixed fault occurs in another processor; 1811, 1822, 1831, 1841 system control tables SCT0–SCT3 for use by the SCP0–SCP3; 1850 a fault information saving area for the SSP; 1851 a fault information saving area for PU1; 1812, 1823, 1832 PU information on the SCP0–SCP3; 1855 a PU substitution processing; 1860 an area to which the OS is allocated; 1861 a recovery processing program for OS processing interrupted by a failed processor; and 1870 an area to which applications are allocated.

In the embodiment of the present invention explained below, the system control program is provided with the PU substitution program 1855 for recovering a system control program interrupted by a fixed processor fault in the SSP 105, such that the interrupted system control program is relieved on a normal processor in a multiprocessor configuration, thus allowing for the relief of the computer system.

Figure 19:
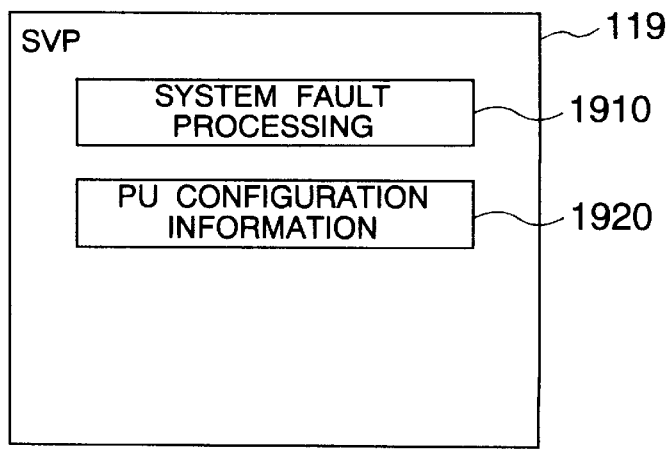
FIG. 19 is a block diagram illustrating the internal configuration of the SVP.

FIG. 19 is a block diagram illustrating the internal configuration of an SVP 119. In FIG. 19, 1910 designates processing for detecting a system fault and for stopping the system; and 1920 PU configuration information.

FIG. 20 is a diagram for explaining details of the PU configuration information 1920 set in the SVP 119. Configuration information 2010 and CPU addresses 2020 of the SSP and the IP are set in the PU configuration information 1920. An installed PU bit 2011, an SSP operation PU bit 2012, an IP operation PU bit 2013 are set in the configuration information 2010, and a CPU address 2021 of the SSP, a CPU address 2022 of the IP0, a CPU address 2023 of the IP1, and a CPU address 2024 of the IP2 are set in the configuration information 2010.

FIG. 21 is a diagram for explaining the structure of the PU information 1812 in the system control table SCT0 for use by the SCP0. The PU information corresponding to the SCP1—the SCP3 also has the same format.

The PU information is formed of system PU configuration information 2110, PU operation information 2120, and SCP control information. Set in the configuration information 2110 are an installed PU bit 2111, an SSP operation PU bit 2112, and an IP operation PU bit 2113 which are the contents copied from the PU configuration information on the SVP. Set in the operation information 2120, in turn, are a number 2121 of a PU on which the SCP is running, a PU serial number (S/N number) 2122, and a CPU address 2123.

FIG. 22 is a diagram for explaining the structure of the SSP fault information saving area 1850 for saving the states of the SCP processing and the OS processing which have been running when a fixed fault occurred in the SSP. The IP0 fault information saving area 1851 is also formed in the same format as the SSP fault information saving area 1850.

As illustrated in FIG. 22, saved in the SSP fault information saving area 1850 are a valid flag 2210 indicative of a preservation state; an operation state flag 2211 indicating whether processing executed when a fixed fault occurred is the SCP or the OS; an SCT address 2122; a CPU address 2213; a prefix register 2214; a program status word (PSW) 2215; a CPU timer 2216; a clock comparator 2217; a general-purpose register 2218; a control register 2219; a floating point register 2220; and an access register 2221.

Explained next is an SSP recovery method for a fixed fault occurring in a system supporting processor SSP, which only runs a system control program, in the other embodiment of the present invention configured as described above. It is assumed, for the purpose of explanation, that processing A of the OS is running on the IP0, and processing B of the OS is running on the IP1. If a fixed fault occurs in the SSP in this state while the SSP is running the SCP0, the SCP0 is interrupted and the faut detection processing 1702 is executed in the $\mu$P 1701.

FIG. 23 is a flow chart for explaining the operation of the fault detection processing in the $\mu$P. In the following, this operation will be explained.

(1) The fault detection processing in $\mu$P detects a fixed fault in the SSP, and saves internal states of the SSP in the SCP information saving area of the SSP information saving area 1850 (steps 2300, 2301). (2) After reporting the fixed fault in the SSP to the other IPs, the SSP is set into a check stop state. While the conventional fault detection processing only saves interrupt recovery information in the processing associated with the OS, the corresponding processing according to the present invention saves the address of the system control table and the CPU address as well as a flag indicating whether the processing interrupted by the fixed fault of the processor is the processing associated with the OS or a system control program, in order to recover the interrupted system control program (steps 2302, 2303).

FIG. 24 is a flow chart for explaining the malfunction alarm processing executed by the SCP1 of the IP0 which detects a fixed fault in the SSP. In the following, this processing will be explained. (1) The SCP1 of the IP0, upon receiving and detecting the report on the fixed fault from the SSP, starts the malfunction alarm processing to detect the fixed fault into the SSP, set the processing A running on the IP0 in an I-STOP state, and save the operating state of the OS in the IP0 information saving area 1851 (steps 2400–2402).

(2) After the states have been completely saved in the processing at step 2402, saved information on the SSP is fetched from the SSP information saving area to determine the operating state of the SSP at the time the fault occurred (steps 2403, 2404).

(3) If it is determined at step 2404 that the processing interrupted by the fixed fault of the processor is the processing associated with the OS, a malfunction alarm is reported to the OS of the IP0, and the OS of the IP0 is subjected to I-START (steps 2405, 2406).

(4) If it is determined at step 2404 that the processing interrupted by the fixed fault of the processor the processing associated with the system control program (SCP), all the IPs are set into an I-STOP state. This causes the processing B in the IP1 to enter I-STOP state. Then, the PU substitution processing 175 is invoked for substituting the IP0 for the SSP (steps 2407, 2408).

In the processing described above, when the processing associated with the OS has been interrupted by the fixed fault of the processor, the interrupted processing is relieved by the conventional interrupted-processing recovery processing for the OS.

Figure 25:
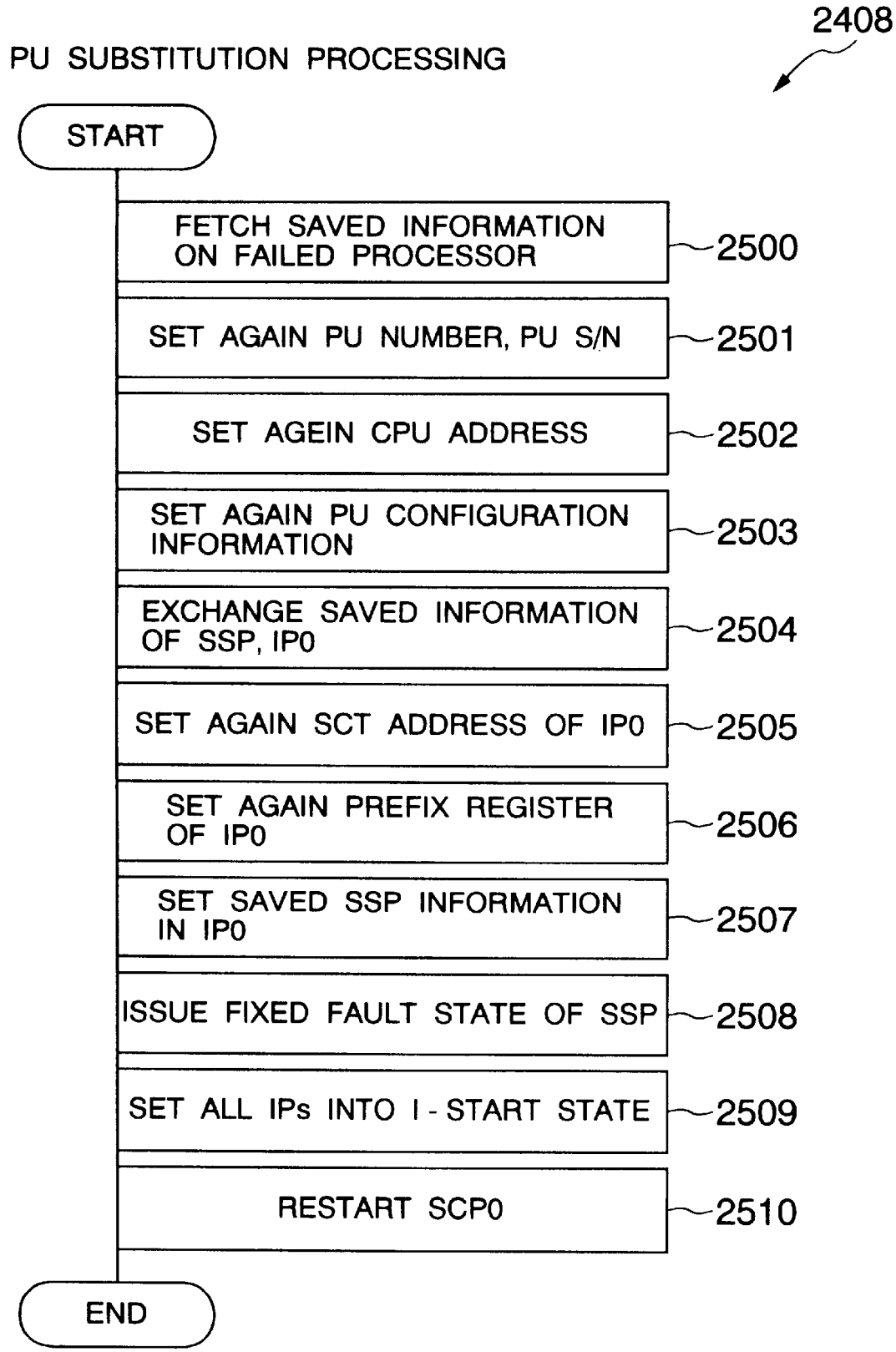
FIG. 25 is a flow chart for explaining PU substitution processing invoked at step 2408.

FIG. 25 is a flow chart for explaining the PU substitution processing invoked at step 2408. In the following, this processing will be explained.

(1) Saved information on the SSP, which is the failed processor, is fetched from the SSP information saving area, and set again to exchange the PU number and the PU serial number in the SCT0, SCT1 (steps 2500, 2501).

(2) The PU configuration information 185 in the SVP and the CPU addresses in the SCT0, SCT1 are set again, and the PU configuration information 185 in the SVP and the PU configuration information in the SCT0, SCT1, SCT2 are set again (steps 2502, 2503).

(3) The saved information on the SSP and the IP0 are exchanged between the SSP information saving area 1850 and the IP0 information saving area 1851. The exchange of the PU configuration information and the saved information, realized by the processing so far executed, causes the OS and the SCP running on the IP0 to appear that they have been running on the SSP and the SCP running on the SSP to appear that they have been running on the IP0, when viewed from the other PUs. In other words, the IP0 has been substituted for she SSP.

(4) Thereafter, the address of the SCT0 for the SCP0 is set again in the system control table address preservation register in the IP0, and the contents of the prefix register in the SSP is set again in the prefix register in the IP0 (steps 2505, 2506).

(5) In the processing at step 2500, the contents fetched from the saved information of the SSP are set inside the IP0, a fixed fault state of the SSP is issued, and all the IPs are set into I-START state. Also, the SCP0 is restarted. This allows the SCP0 to continue its operation on the IP0. In other words, the previous IP0 will subsequently operate as the SSP (steps 2507–2510).

In the foregoing description, the IP1 forces I-START to the OS in response to an I-START request from the substitution processing, and then the OS, resuming the operation, detects the malfunction alarm caused by the fixed fault state of the SSP issued at step 2508 and executes the interrupted-processing recovery processing. This interrupted-processing recovery processing, which is the conventional processing for resuming the interrupted OS, controls the SSP to be offline, and then fetches information on the interrupted processing A from the SSP information saving area to resume the processing A.

As described above, according to the other embodiment of the present invention, when a fixed fault occurs in a system supporting processor which only runs a system control program in a computer system of a multiprocessor configuration, a normal processor is substituted for the system supporting processor, thereby permitting the system to continuously operate.

According to the foregoing embodiments, it is possible to continuously execute software which has been running on an alternate IP when the SSP was substituted as well as to ensure that the processing under execution on the SSP can also be continuously executed on the alternate SSP, thus improving the reliability.

Also, in a multiprocessor computer system, information on interrupted processing of a system control program, which has been under execution when a fixed fault occurred, is saved, the occurrence of the fixed fault of the processor is detected by a normal processor, and configuration information of the failed processor is exchanged with configuration information of the normal processor, so that the interrupted system control program can be resumed on the normal processor.

In a multiprocessor computer system, a saving area can be reserved in a storage area of hardware shared by processors, when a fixed fault occurs in a processor, to save a control table address and an operation status flag for operating a system control program and a CPU address for controlling the OS, as well as to save information on interrupted processing of a system control program which has been under execution.

In a multiprocessor computer system, saved information is fetched when a fixed fault occurs in another processor to determine whether interrupted processing is a processor control program or processing associated with the OS, so that the processing for substituting a normal processor for the failed processor can be invoked.

In a multiprocessor computer system, information on processing under execution on a normal processor is saved, so that the processing can be resumed on another normal processor after the normal processor is substituted for a failed processor.

What is claimed is:

1. A processor fault recovering method for recovering a fixed fault which occurs in a processor of a computer system of a multiprocessor configuration, said computer system comprising a plurality of processors, at least one of which is operated as a system supporting processor, and the rest of which are operated as instruction processors, characterized by:

generating an interrupt to an operating system running on at least one instruction processor when a fault occurs in said system supporting processor;

recognizing in said operating system in said instruction processor that a fault has occurred in said system supporting processor;

abnormally terminating an application program running on said instruction processor at the time said interrupt was generated; and substituting said instruction processor for said system supporting processor to execute the processing thereof.

2. A processor fault recovering method for recovering a fixed fault which occurs in a processor of a computer system of a multiprocessor configuration, said computer system comprising a plurality of processors, at least one of which is operated as a system supporting processor, and the rest of which are operated as instruction processors, characterized by:

interrupting, in at least one instruction processor, instruction processing under execution when a fault occurs in said system supporting processor;

saving processor resources required to continue the processing of a program which has been running on said instruction processor in a main storage device;

entering a hardware fault state to stop the instruction processing;

reporting the hardware fault to at least one instruction processor different from said instruction processor;

in said other instruction processor, upon receiving the report, forcing an operating system to generate an interrupt which instructs to continue the operation of the failed instruction processor; and substituting said instruction processor, which has interrupted the instruction processing, for said system supporting processor to execute the processing thereof.

3. A processor fault recovering method for recovering a fixed fault which occurs in a processor of a computer system of a multiprocessor configuration, said computer system comprising a plurality of processors, at least one of which is operated as a system supporting processor, and the rest of which are operated as instruction processors, characterized by:

reporting the occurrence of the fault to at least one instruction processor, when a fault occurs in said system supporting processor;

generating an interrupt indicative of substitutional processing of said system supporting processor to an operating system running on said instruction processor;

said operating system, upon receiving said interrupt, displaying a system message indicating that the interrupt has been generated, and inputting a command for disconnecting an alternate instruction processor for said system supporting processor corresponding to said system message by a program which receives said system message and inputs an automatic response command to a previously registered message; and substituting said instruction processor for said system supporting processor to execute the processing thereof.

4. A processor fault recovering method for an information processing system according to claim 1, 2 or 3, characterized in that when a fault occurs in said system supporting processor, said instruction processor substituted for said system supporting processor to execute the processing thereof registers in one or more configuration storage areas that said instruction processor itself is a system supporting processor, checks the presence or absence of interrupted processing which has been under execution at the time the fault occurred in said system supporting processor, and takes over the execution of the interrupted processing of said system supporting processor.

5. A processor fault recovering method for an information processing system according to claim 4, characterized in that said instruction processor comprises a program for executing the processing of said system supporting processor, this program storing the states under processing in said system supporting processor in a status storage area on a main storage device, and checking processing state to execute succession processing corresponding to said processing state, thereby executing the recovery processing after the occurrence of the fault in said system supporting processor.

6. A processor fault recovering method for an information processing system according to claim 4, characterized in that said instruction processor comprises a program for executing the processing of said system supporting processor, this program checking records indicative of progress situations stored by said system supporting processor in a main storage device at the end of every predetermined processing units of processing under execution before the fault occurs in said system supporting processor, checking the contents of said records of progress situations if remaining therein, and executing uncompleted processing to thereby execute recovery processing after the occurrence of the fault in said system supporting processor.

7. A processor fault recovering method for an information processing system according to claim 4, characterized in that:

said instruction processor comprises a program for executing the processing of said system supporting processor, wherein:

this program starts processing when an invoke request is set as an invoke inducing information for it before the occurrence of the fault in said system supporting processor, this program erases the invoke request when the processing is terminated, and checks whether or not it had been under execution by said invoke inducing information for it at the time the fault occurred in said system supporting processor, and the execution of this program is started from the beginning when said invoke inducing information indicates that an invoke request exists, thereby executing recovery processing after the occurrence of the fault in said system supporting processor.

8. A processor fault recovering method for recovering a fixed fault which occurs in a processor of a computer system of a multiprocessor configuration, said computer system comprising a plurality of processors, at least one of which is operated as a system supporting processor, and the rest of which are operated as instruction processors, characterized by:

saving information on interrupted processing of a system control program which has been under execution in said system supporting processor when a fault occurred in said system supporting processor;

detecting the occurrence of the fault in said system supporting processor by a normal instruction processor; and exchanging allocation of configuration information between said failed system supporting processor and said normal instruction processor so that said normal instruction processor resumes an interrupted system control program.

9. A processor fault recovering method for an information processing system according to claim 8, characterized by:

reserving a saving area in a hardware area of a main storage shared by the plurality of processors, saving a control table address and an operation status flag for operating a system control program and a CPU address for controlling an operating system; and saving information on interrupted processing of the system control program which has been under execution.

10. A processor fault recovering method for an information processing system according to claim 9, characterized by:

fetching said saved information;

determining whether the interrupted processing is a system control program or processing associated with the operating system; and invoking processing for substituting a normal instruction for the failed system supporting processor to execute the processing thereof.

11. A processor fault recovering method for an information processing system according to claim 8, characterized by:

saving information on processing which has been running on a normal instruction processor at the time said fault occurred in said system supporting processor, said normal instruction processor resuming said system control program;

substituting a normal instruction processor for said failed system supporting processor to execute the processing thereof; and thereafter resuming the processing executed on said normal instruction processor on another normal instruction processor.

* * * * *